(12) United States Patent
Werner et al.

(10) Patent No.: US 8,806,834 B2
(45) Date of Patent: Aug. 19, 2014

(54) SOLAR TROUGH MIRROR FRAME, ROLLING RIB, ROLLER, CLEANING APPARATUS AND METHOD

(75) Inventors: Craig Roy Werner, Lake Forest, IL (US); John Funai, Lake in the Hills, IL (US)

(73) Assignee: Werner Extrusion Solutions LLC, Libertyville, IL (US)

( * ) Notice: Subject to any disclaimer, the term of this patent is extended or adjusted under 35 U.S.C. 154(b) by 273 days.

(21) Appl. No.: 12/587,043

(22) Filed: Oct. 1, 2009

(65) Prior Publication Data

US 2010/0058703 A1    Mar. 11, 2010

Related U.S. Application Data

(63) Continuation-in-part of application No. 12/583,787, filed on Aug. 26, 2009.

(60) Provisional application No. 61/195,087, filed on Oct. 3, 2008, provisional application No. 61/190,573, filed on Aug. 29, 2008.

(51) Int. Cl.
*E04H 12/00* (2006.01)

(52) U.S. Cl.
USPC .......... 52/648.1; 52/633; 52/653.1; 52/653.2; 126/600

(58) Field of Classification Search
USPC ............ 52/633, 648.1, 653.1, 653.2; 126/600
See application file for complete search history.

(56) References Cited

U.S. PATENT DOCUMENTS

| | | | | |
|---|---|---|---|---|
| 1,683,266 A | * | 9/1928 | Shipman | 126/683 |
| 2,744,472 A | * | 5/1956 | Symons | 105/154 |
| 3,228,354 A | * | 1/1966 | Gutridge et al. | 410/88 |
| 4,029,199 A | * | 6/1977 | Reens | 198/683 |
| 4,056,309 A | * | 11/1977 | Harbison et al. | 359/847 |
| 4,111,184 A | * | 9/1978 | Fletcher et al. | 126/577 |
| 4,136,671 A | * | 1/1979 | Whiteford | 126/654 |
| 4,245,616 A | * | 1/1981 | Wyland | 126/579 |
| 4,286,581 A | * | 9/1981 | Atkinson, Jr. | 126/585 |
| 4,333,446 A | * | 6/1982 | Smyth | 126/574 |
| 4,552,073 A | * | 11/1985 | Smith | 105/154 |
| 4,599,032 A | * | 7/1986 | Haus, Jr. | 414/542 |
| 4,649,899 A | * | 3/1987 | Moore | 126/578 |
| 4,870,949 A | * | 10/1989 | Butler | 126/571 |
| 5,191,875 A | * | 3/1993 | Edling et al. | 126/576 |
| 5,281,033 A | * | 1/1994 | Ide | 384/213 |
| 5,787,878 A | * | 8/1998 | Ratliff, Jr. | 126/680 |

(Continued)

*Primary Examiner* — Basil Katcheves
*Assistant Examiner* — Joshua Ihezie
(74) *Attorney, Agent, or Firm* — Ansel M. Schwartz

(57) ABSTRACT

A support system for holding solar mirrors of a solar trough system includes a frame for supporting the mirrors. The system includes a rib attached to the frame. The system includes at least a first roller engaged with the rib along which the rib moves as the frame moves. A method for moving a frame supporting solar mirrors of a solar trough system includes the steps of moving the frame on a roller guided by a rib engaged with the roller and attached to the frame bottom to a first position. There is the step of moving the frame on the roller guided by the rib engaged with the roller and attached to the frame bottom to a second position. A roller for engaging with a rib attached to a frame that holds mirrors of a solar trough system. A rib for a frame that holds solar mirrors of a solar trough system which engages with a roller. A support system for mirrors of a solar trough system.

7 Claims, 40 Drawing Sheets

(56) References Cited

U.S. PATENT DOCUMENTS

| | | | |
|---|---|---|---|
| 5,937,849 A * | 8/1999 | Myles et al. | 126/562 |
| 6,485,152 B2 * | 11/2002 | Wood | 359/853 |
| 7,203,004 B2 * | 4/2007 | Zhang | 359/593 |
| 7,578,109 B2 * | 8/2009 | Reynolds et al. | 52/648.1 |
| 7,587,862 B2 * | 9/2009 | Reynolds et al. | 52/81.3 |
| 7,950,386 B2 * | 5/2011 | Lievre | 126/600 |
| 2004/0216734 A1 * | 11/2004 | Lawheed | 126/573 |
| 2008/0072516 A1 * | 3/2008 | Reynolds et al. | 52/694 |
| 2008/0204352 A1 * | 8/2008 | Reynolds et al. | 343/880 |
| 2008/0308094 A1 * | 12/2008 | Johnston | 126/694 |
| 2009/0056701 A1 * | 3/2009 | Mills et al. | 126/606 |
| 2009/0126364 A1 * | 5/2009 | Mills et al. | 60/641.8 |
| 2011/0107939 A1 * | 5/2011 | Amiri | 104/242 |

* cited by examiner

SOLAR TROUGH MIRROR FRAME, ROLLING RIB, ROLLER, CLEANING APPARATUS AND METHOD

CROSS-REFERENCE TO RELATED APPLICATIONS

This application is related to U.S. provisional application Ser. No. 61/195,087 filed Oct. 3, 2008. This application is a continuation-in-part of U.S. patent application Ser. No. 12/583,787 filed Aug. 26, 2009, which is related to U.S. provisional application Ser. No. 61/190,573 filed Aug. 29, 2008, all of which are incorporated by reference herein.

FIELD OF THE INVENTION

The present invention is related to a support system for holding solar mirrors of a solar trough system. (As used herein, references to the "present invention" or "invention" relate to exemplary embodiments and not necessarily to every embodiment encompassed by the appended claims.) More specifically, the present invention is related to a support system for holding solar mirrors of a solar trough system using a rib attached to a frame of the support system that moves along rollers, and a system for cleaning the mirrors which can be used with this or other CSP (concentrated solar power) frame systems.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The parabolic trough design of concentrated thermal solar frames uses parabolic mirrors to focus and concentrate the sun's energy on an insulated tube filled with heat transfer fluid; this fluid is heated to generally well above 700 d.F. and circulated to a steam turbine power generation plant (See FIGS. 1 and 2).

FIG. 1 is a schematic of concentrated solar parabolic trough system. Parabolic mirrors rotate to track the sun as it traverses the sky. FIG. 2 is a schematic that shows the concept of the parabolic mirrors concentrating the sun's rays onto a small diameter collector tube at the parabola's focal point.

The frames supporting these structures are large, stiff truss-like structures designed to support the weight of the mirrors and the wind loads (which can be substantial) in a manner which both keeps the units structurally sound and minimizes deflections to achieve high conversion efficiencies of the sunlight into energy; any deflections reduce this efficiency.

The frames pivot about a line which is generally the center of mass of the minors, tubes and frames combined; this pivoting enables the mirrors to "track" the sun as it traverses across the sky. The current designs use elevated pivot points at each end of the frame with bearings, and drive arms which transfer the rotational forces from one frame to another (a single drive unit turns several frames in the row); generally, these end supports require large footings.

A simple, practical design to dramatically reduce the loads on the pivot points 34 and upon the frame members, resulting in less deflection and improved optical alignment has been developed. This is called the "Rolling Rib" design (and derivations of it, including the incorporation of minor washing and water reclamation integrated into any solar frame design).

BRIEF SUMMARY OF THE INVENTION

The present invention is related to a support system for holding solar minors of a solar trough system. The system comprises a frame for supporting the minors. The system comprises a rib attached to the frame. The system comprises at least a first roller engaged with the rib along which the rib moves as the frame moves. The ends of the rib may have slight bevels to engage more easily when first in contact with the curvature of the roller(s).

The present invention pertains to a method for moving a frame supporting solar mirrors of a solar trough system. The method comprises the steps of moving the frame on a roller guided by a rib engaged with the roller and attached to the frame bottom to a first position. There is the step of moving the frame on the roller guided by the rib engaged with the roller and attached to the frame bottom to a second position.

The present invention pertains to a roller for engaging with a rib attached to a frame that holds mirrors of a solar trough system. The roller comprises a housing which receives the rib. The roller assembly comprises a roller or rollers disposed in the housing on which the rib moves when the frame moves.

The present invention pertains to an apparatus for cleaning solar mirrors on a frame of a solar trough system. The apparatus comprises a spray assembly for spraying fluid on the mirrors. The apparatus comprises a gutter mounted to the framework which collects the fluid sprayed on the minors.

The present invention pertains to a method for cleaning minors on a framework of a solar trough system. The method comprises the steps of spraying fluid on the minors with a spray assembly. There is the step of collecting the fluid sprayed on the minors with a gutter mounted to the framework. There is the step of directing the fluid in the gutter to a desired location.

The present invention pertains to a rib for a frame that holds solar mirrors of a solar trough system which engages with a roller. The rib comprises a profile having a top portion that attaches to the frame, a central portion extending from the top portion and a bottom portion that engages with the roller. The rib moving along the roller as the frame moves.

The present invention pertains to a support system for mirrors of a solar trough system. The system comprises means for supporting the mirrors. The system comprises a rib attached to the frame. The system comprises roller means engaged with the rib along which the rib moves as the supporting means moves.

BRIEF DESCRIPTION OF THE SEVERAL VIEWS OF THE DRAWING

In the accompanying drawings, the preferred embodiment of the invention and preferred methods of practicing the invention are illustrated in which:

FIG. 16a shows the normal existing configuration with a 12 m frame supported from each end. FIG. 16b shows a configuration with a single rolling rib supporting the center of a 12 m frame in addition to the support from each end. FIG. 16c shows two rolling ribs supporting a longer (16 m) frame in the mid section in addition to the support from each end.

DETAILED DESCRIPTION OF THE INVENTION

Figure 3:
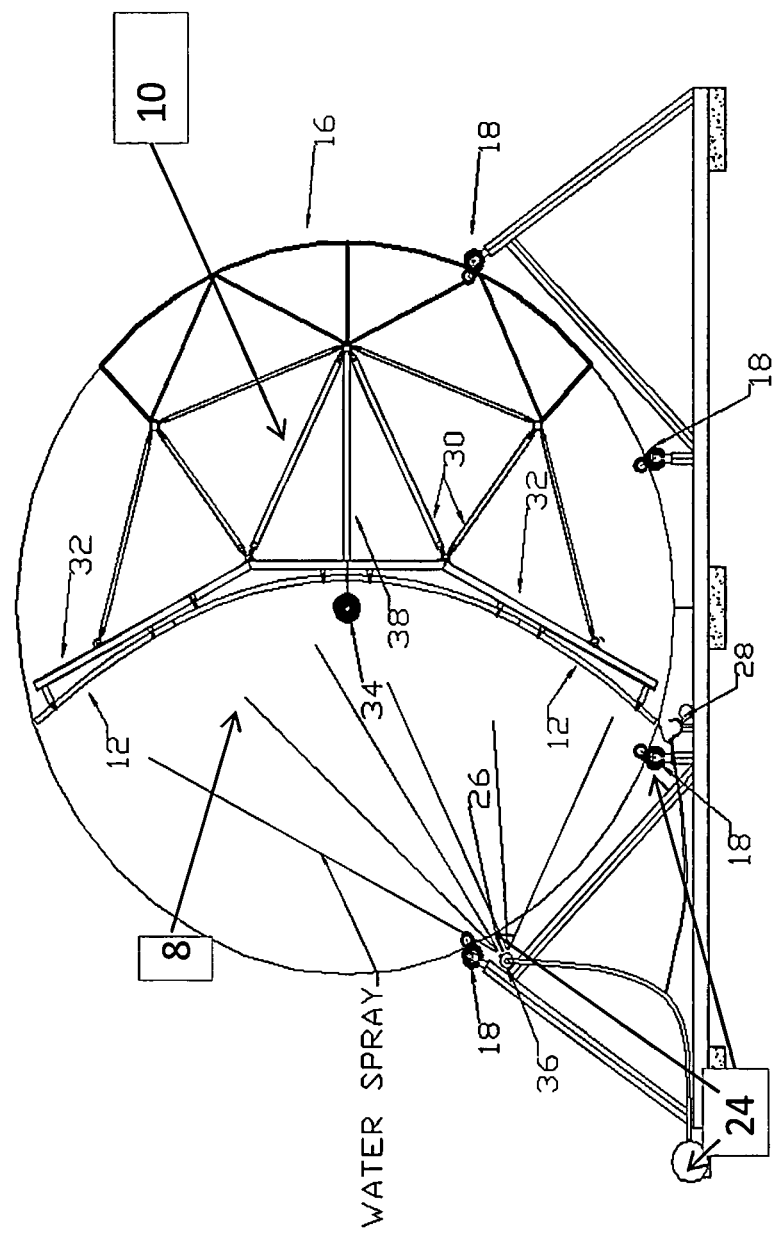
FIG. 3 shows an end view of a "Series 5" (5 triangles as viewed from the end) Parabolic Frame with "Rolling Rib" system and with a mirror cleaning system.
Figure 4:
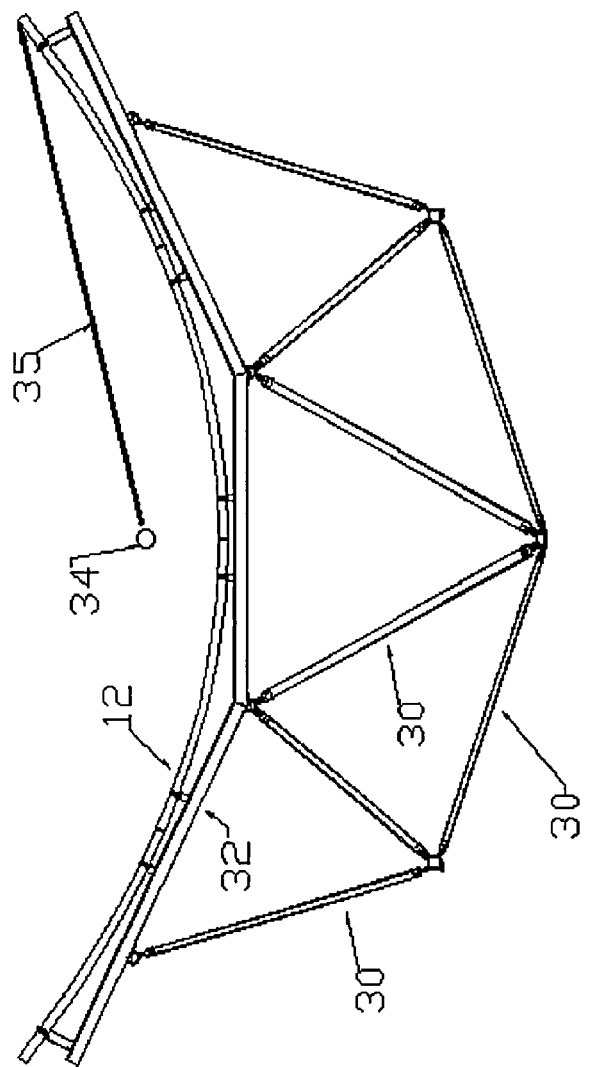
FIG. 4 shows the "Series 5" design with 5 triangles as viewed from the end, depicting the radius of "Rolling Rib" required.

Referring now to the drawings wherein like reference numerals refer to similar or identical parts throughout the several views, and more specifically to FIGS. 3 and 4 thereof, there is shown a support system 10 for holding solar mirrors 12 of a solar trough system 8. The system 10 comprises a frame 14 for supporting the mirrors 12. The system 10 comprises a rib 16 attached to the frame 14. The system 10 comprises at least a first roller assembly (note: the term roller assembly is used as it suggests a system supporting the "Rolling Rib" both from above and below, but it can also refer to designs with a single roller) 18 engaged with the rib 16 along which the rib 16 moves as the frame 14 moves.

The present invention pertains to a method for moving a frame 14 supporting solar mirrors 12 of a solar trough system 8. The method comprises the steps of moving the frame 14 on a roller assembly 18 guided by a rib 16 engaged with the roller assembly 18 and attached to the frame 14 bottom to a first position. There is the step of moving the frame 14 on the roller assembly 18 guided by the rib 16 engaged with the roller assembly 18 and attached to the frame 14 bottom to a second position.

The present invention pertains to a roller assembly 18 for engaging with a rib 16 attached to a frame 14 that holds mirrors 12 of a solar trough system 8. The roller assembly 18 comprises a housing 20 which receives the rib 16 and supports the rollers. The roller assembly 18 is comprised of rollers 18a, 18b & 18c disposed in the housing 20 on which the rib 16 moves when the frame 14 moves.

The present invention pertains to an apparatus 24 for cleaning solar mirrors 12 on a frame 14 of a solar trough system 8. The apparatus 24 comprises a spray assembly 26 for spraying fluid on the mirrors 12. The apparatus 24 comprises a gutter 28 mounted to the framework which collects the fluid sprayed on the mirrors 12.

The present invention pertains to a method for cleaning mirrors 12 on a framework of a solar trough system 8. The method comprises the steps of spraying fluid on the mirrors 12 with a spray assembly 26. There is the step of collecting the fluid sprayed on the mirrors 12 with a gutter 28 mounted to the framework. There is the step of directing the fluid in the gutter 28 to a desired location.

The method preferably includes the step of moving the mirrors 12 into position for spraying.

The present invention pertains to a rib 16 for a frame 14 that holds solar mirrors 12 of a solar trough system 8 which engages with a roller assemblie(s) 18. The rib 16 comprises a profile 40 having a top portion 42 that attaches to the frame 14, a central portion 44 extending from the top portion 42 and a bottom portion 46 that engages with the roller 18 (the bottom portion 46 is shown slightly slanted such that it is more likely that dirt and debris do not collect). The rib 16 moves along the roller assembly 18 as the frame 14 moves. Also note that the ends of the "Rolling Rib" may be beveled to ease initial contact with the curved rollers.

The present invention pertains to a support system 10 for mirrors 12 of a solar trough system 8. The system 10 comprises means for supporting the mirrors 12. The system 10 comprises a rib 16 attached to the frame 14. The system 10 comprises roller means engaged with the rib 16 along which the rib 16 moves as the supporting means moves.

The supporting means can be the frame 14. The roller means can be the roller assemblie(s) 18.

In FIG. 3, there is shown an end view of "Series 5" geometry design (5 triangles viewed from the end) of a Parabolic Frame showing the pivot point 34, the Extra center support 38, the additional "Rib" 16 supporting the underside of the frame and a "Rolling Rib" frame structure to support the rotating Solar Frame with four (4) rollers depicted (as few as one or as many as desired roller assemblies can be utilized). Also shown are mirror washing and water collection devices. A gutter system for mirror cleaning and water reclaim may be used. The gutter cap can be fixed or have the ability to rotate by water pressure actuators or by lever action to keep dirt, debris, sand, etc. from accumulating.

In the operation of the invention and referring to FIG. 4, there is shown an end view of a "Series 5" geometry design (5 triangles viewed from the end) of Parabolic Frame 14 showing the pivot point 34, the extra center support 38, the additional "Rib" 16 supporting the underside of the frame 14 and a "Rolling Rib" frame 14 structure to support the rotating solar frame 14 with four (4) rollers. Also shown are mirror washing and water collection devices. Looking at a cross section of a frame 14 (in FIG. 4 for the "Series 5" design), such that one can see the parabolic shape of the mirror 12: by drawing a line from the pivot point 34 (small circle at the "start" end of the arrow) to the farthest tip of the mirror 12 (point end of the arrow) the minimum radius of a circumscribing circle can be defined that defines the traverse of the outermost parts of the mirror 12. This large circle was chosen to enable the frame 14 to pivot 360 degrees without worrying about interference between with the mirrors 12 and the roller assemblies 18; smaller diameters are certainly possible, if the supports and roller 18 assemblies (described below) fall between the mirror sections which are separated sufficiently along the length of the frames 14 (for example, between mirrors 3 and 4 and 4 and 5 for a 12 meter frame 14 with 7 mirrors along its length (numbering depicted in FIG. 5)). 35 is the minimum "rib" diameter so that mirrors clear it during rotation.

FIG. 4 shows the "Series 5" geometry design with 5 triangles as viewed from the end. (Pivot point 34 as small circle above parabolic mirrors 12 with the arrow drawn from the circle representing the minimum radius of the circumscribing circle).

Figure 5:
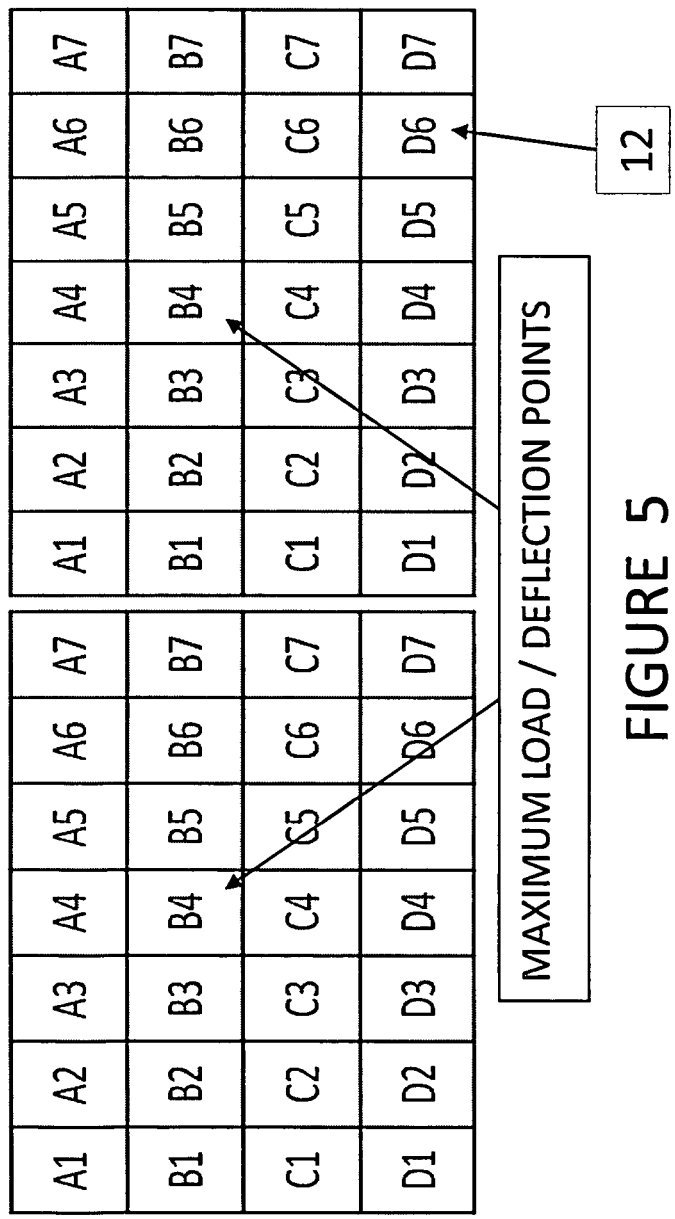
FIG. 5 is a top view of two frames side by side, each with four rows (A, B, C & D) of seven (7) mirrors.

FIG. 5 is a top view of two frames side by side, each with four rows (A, B, C & D) of seven (7) mirrors. Arrows point to most likely a high deflection/force area.

Looking at the cross section of the frame 14 (FIG. 6) and the mirrors 12, the maximum loading of the system 10 occurs due to a combination of wind load, weight and the torque of a line of these mirror/frame assemblies driven from a central rotational drive. For discussion purposes, the maximum loads and deflections will occur at the center of the parabolic span, at the intersection of mirrors B4 and C4 (FIG. 5) (depending on wind loading and the "flow" of air over the mirror in different orientations, the wind loading is not likely exactly equal to an evenly loaded lbs/sq. ft. calculation). The trusses of the frame 14 (FIG. 4) are designed as larger members at this point to deal with the larger resulting tensile and compressive forces (in FIG. 4, note the two largest/thickest struts 30 forming the inside "V" at the very bottom of the frame 14.

Figure 1:
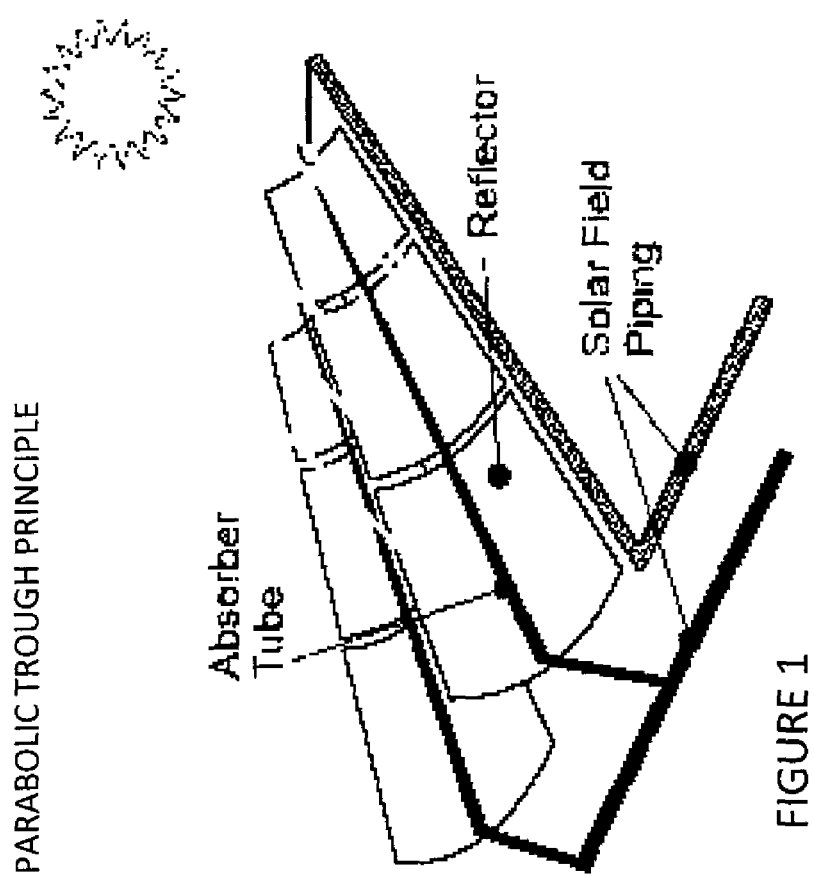
FIG. 1 is a schematic of concentrated solar parabolic trough system.
Figure 2:
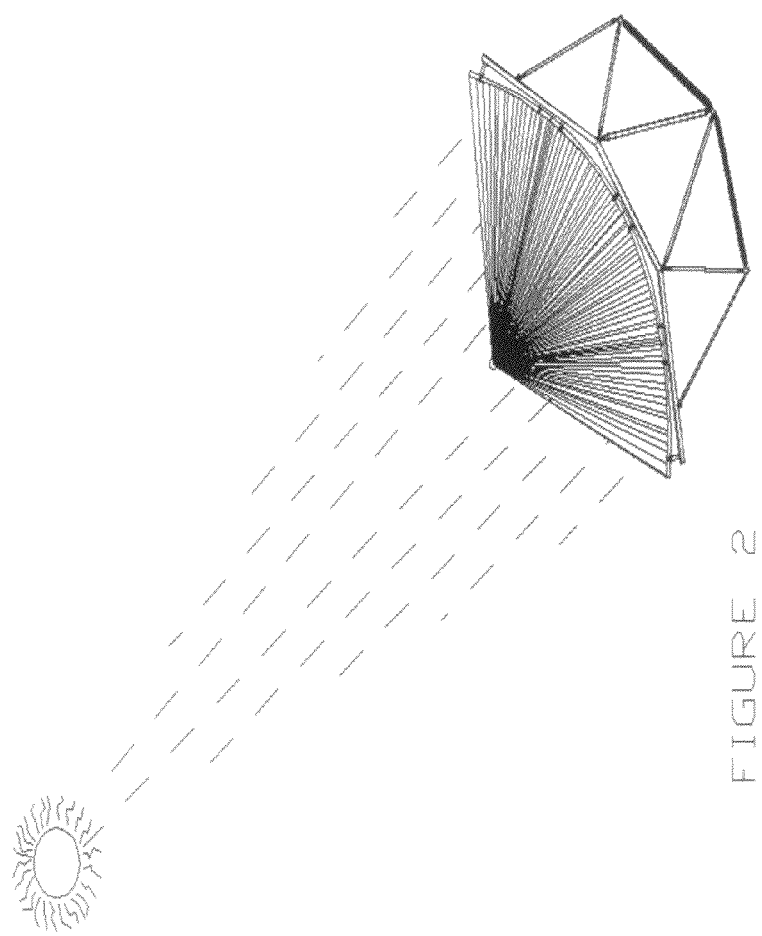
FIG. 2 is a schematic which shows the concept of parabolic mirror concentrating the sun's rays onto a small diameter collector tube at the parabola's focal point.

The frame 14 designs should take into account wind load conditions in all different possible orientations of the mirror direction. Under certain wind conditions, the frame 14 may rotate to take it out of service to protect it, but in many instances, the high wind loads occur during normal operational periods. The focal length of the parabolic mirror shape is critical to focus the maximum energy on the solar collector tube—any frame 14 deflections reduce this intense focus (see FIG. 2). Depending on what direction the mirrors 12 are pointed, and the direction/intensity of the wind load, the system 10 can be subject to loads from the weight of the frame 14, the pressure (or lift) of the wind and any torque induced into the structure by the rotational mechanism trying to rotate the mirrors 12 into some position resisted by the long line of mirrors 12 being "torqued" in an opposing direction by wind forces, driven by a drive mechanism immediately next to some frames, but often transferred from this drive frame to the next, and from the next to the next following, etc.

Generally, the wind loads will act upon the mirrors 12 either "pushing" them into the frame 14 structure or attempting to lift them off of the frame 14 structure. The mirrors 12 are attached to mirror supports, which in the "Series 5" frame 14 and shown throughout this document are themselves attached to three I-beams 32 approximating the parabolic shape of the mirrors 12. Please note that the "Rolling Rib" design can be adapted to alternative frame geometries or designs; the "Series 5" was chosen as a single design upon which to depict the "Rolling Rib" to simplify the explanation; for example, frame designs using other mirror support means, no I-beams, etc. . . . can still use the "Rolling Rib" concept. These I-beams 32 are equipped with four (4) "sleeves" fastened under them, through which main support members extend and are fastened; this system 10 holds the seven (7) I-beams 32 under the frame 14 at the preset intervals. The bottom of the frame 14 truss-structure uses three (3) additional sleeve/main support connection lines. The seven (7) sleeves are connected by a series of specially designed struts 30 (with specifically designed strut 30 end pieces incorporated). All of the elements discussed in this paragraph combine to create the space frame 14 which is the WES "Series 5" design solar frame 14. The entire frame 14 is hung from two rotational positions at either end of the 12 meter length. For explanatory purposes, a 12 meter frame is discussed, but the concepts apply equally well to 8 m, 16 m or other lengths of frame systems.

The wind and weight loads either "pushing" into the I-beams 32 or lifting off of them are thus transferred through these pinned strut 30 connections through the truss structure. The entire frame 14 is thus subject to large, complex loading conditions, with the most deflection likely occurring near the center of the 12 meter length, although with rotational torques, the loading is too complex for this assumption to be strictly accurate (structural analysis software modeling all load cases reveals the precise results for each frame design). The "Rolling Rib" design discussed below provides excellent support at this critical central location to minimize loads and deflections on the solar frame 14 system 10, resulting in lower deflection and better solar conversion performance.

Without the "Rolling Rib" system 10, to overcome these forces and the associated deflections, as currently designed the truss members (FIG. 4) must be made stronger and the overall truss "deeper". This causes two problems: First, the weight (cost) of the structure increases with increasing material content (diameter, wall thickness and strut 30 length). Second, compounding the first issue is that as the truss is made "deeper", the strut 30 lengths increase; calculations have shown that the failure mode on these structures can be due to compressive buckling of the long strut 30 members. To avoid this, diameters/or wall thicknesses must be increased even further than deflection calculations alone would suggest.

The "Rolling Rib" design introduces an additional structural member (one is likely for a 12 meter long frame 14, perhaps more for longer frames). This "rib" 16 is attached to the bottom of the solar frame 14 (FIG. 4) either directly if the geometry allows or by truss-like members as shown in the figures. Due to the pivot points 34 of the frame 14 and the structure, the "rib" 16 will be subject to either compressive or tensile forces through the struts 30 connecting it at the cross sectional connection point of the solar frame 14 these forces transfer through the roller assemblies 18.

For drawing simplicity/explanation, these roller assemblies 18 are often shown in many of the overall figures as single rollers 18, which would infer that they only support the solar frame 14 from loads "pushing" into the frame 14; the roller 18 assemblies actually are designed to take both the "pushing" loads into the frame 14 and the "lifting" loads that would occur if the wind, for example, were to be pushing on the underneath portion of the parabolic mirrors 12 (see FIGS. 7, 10, 11b, 12 and 13b).

The purpose of this "rib" 16 is to allow wind/weight/torque forces from the solar frame 14 to be transmitted in a more direct fashion to the ground/foundations vs. trying to do so at only two points at either end of a 12 meter (or other length) span, as is currently the design. By breaking the spans into two or more smaller "spans", and providing the ability to support the structure mid-span, forces and deflection in this region will be much lower and mechanical and optical performance enhanced.

Figure 6:
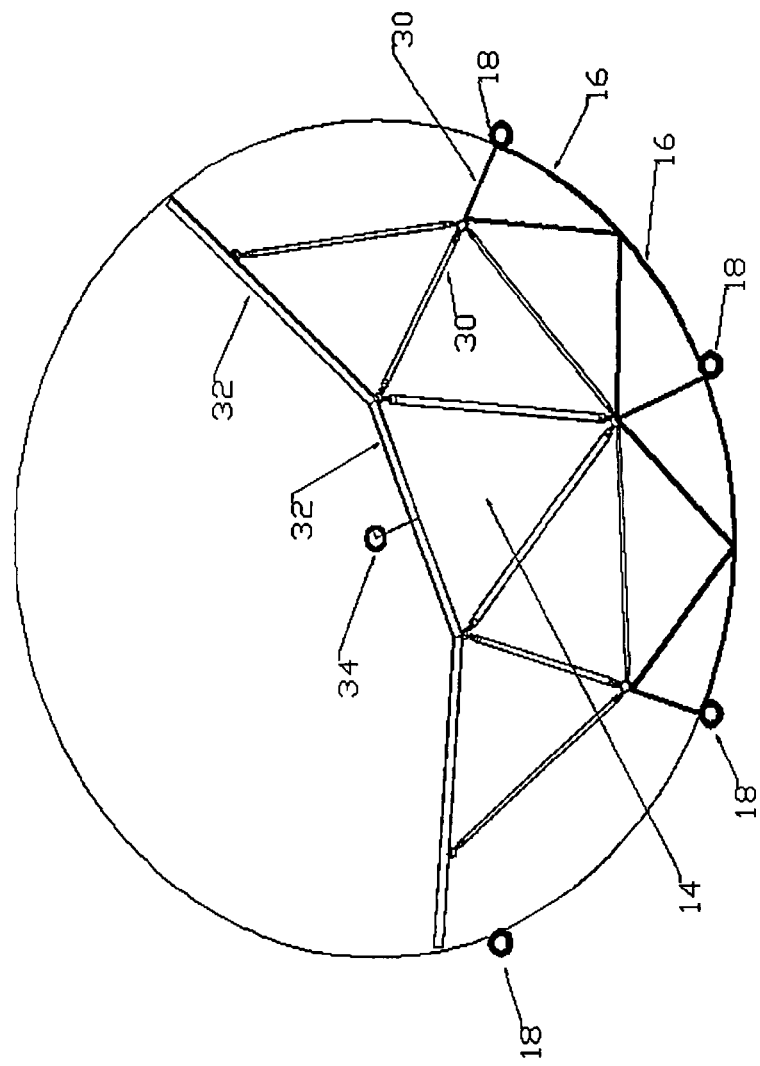
FIG. 6 is a cross section of a "Series 5" solar frame with central pivot point and four (4) rollers on the arc of the bottom of the "Rolling Rib".

FIG. 6 is a cross section of "Series 5" solar frame 14 with central pivot point 34 and four (4) roller assemblies 18 on the arc of the bottom "rib" 16. The roller assemblies 18 constrain the "rib" 16 to provide support no matter what the wind/weight/torque load ("pushing" or "lift" as well as sideways). As shown in this tilt configuration, three (3) roller assemblies 18 support the frame 14 in addition to the central pivot points 34 at either end of the 12 meter frame 14.

Figure 7:
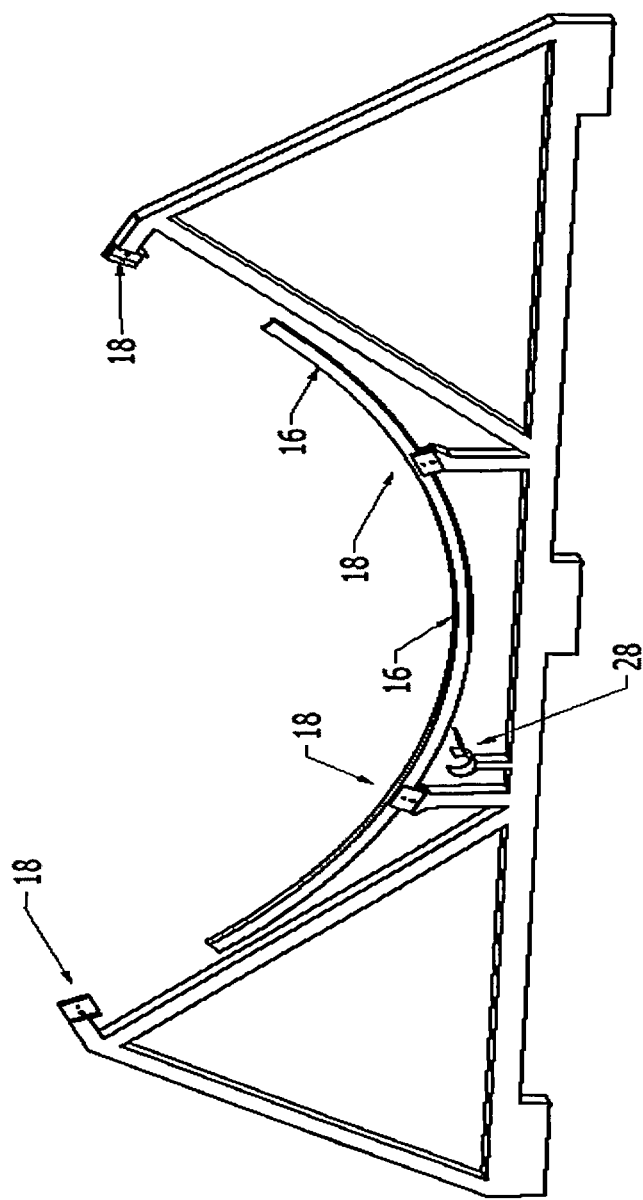
FIG. 7 is the "Rolling Rib" frame with four (4) roller assemblies with a curved rib and with a mirror cleaning "gutter" collector depicted.

FIG. 7 is a cross section of the four (4) roller assemblies 18 with curved "rib" 16.

Stretch-forming aluminum extrusions enable very accurate curvatures to be achieved. In this existing industrial process, aluminum extrusions or other lineals are gripped and put under tension as they are pulled/bent/formed around the shape creating the ID of the curve. The design here is to stretch-form part of a "perfect" circle. This is currently designed with an arc length of approximately 97 degrees, with a length of approximately 16 ft. 9 inches, to exceed the pivot point 34 to mirror tip (shown as an arrow in FIG. 4) radius of 118" (currently, the pivot point 34-to-"rib" 16 radius is drawn at 118.6"). This "rib" 16 is extruded from a 6000 series aluminum alloy (like 6005A or 6105) and either aged then stretch-formed or stretch-formed and then aged. It is then attached to the bottom of a solar frame 14 with appropriate struts 30 such that the center of the arc/circle perfectly coincides with the center of rotation of the solar frame 14; this extrusion would be like a "rib" 16 under the frame 14, at desired points/intervals along the length of the frame 14 breaking the span into two, three or more sections (See the truss-like cross section at the bottom of the parabolic frame 14 in FIG. 6). Other materials than aluminum, other alloys/tempers of aluminum extrusions and other means than stretch-forming are possible to create the curving/bending/shape.

Mounted to the ground would be roller assemblies 18 supported by a simple framework (See FIGS. 3 and 7) which would guide the circular arc stretch-formed extrusion, helping to support the weight/wind load in whatever direction it bears (there would be rollers under the circular arc extrusion and over it as well). Multiple easily extrudable/assemble-able designs have been developed by WES for this purpose (see FIGS. 8-13b). The "ribs 16" could have bearing/wear surfaces (like high density polyethylene or other polymer) inserted into the extrusion as spacers and stretch-formed with the extrusion but a simpler design, with easily replaceable high density (high density polyethylene for example) polymer rollers 18 or wheels 22 bearing on the curved, stretch-formed aluminum extruded "modified" I-beam 32 is shown. The surfaces pointing upwards would be angled to allow dirt/debris to slide off.

Figure 8:
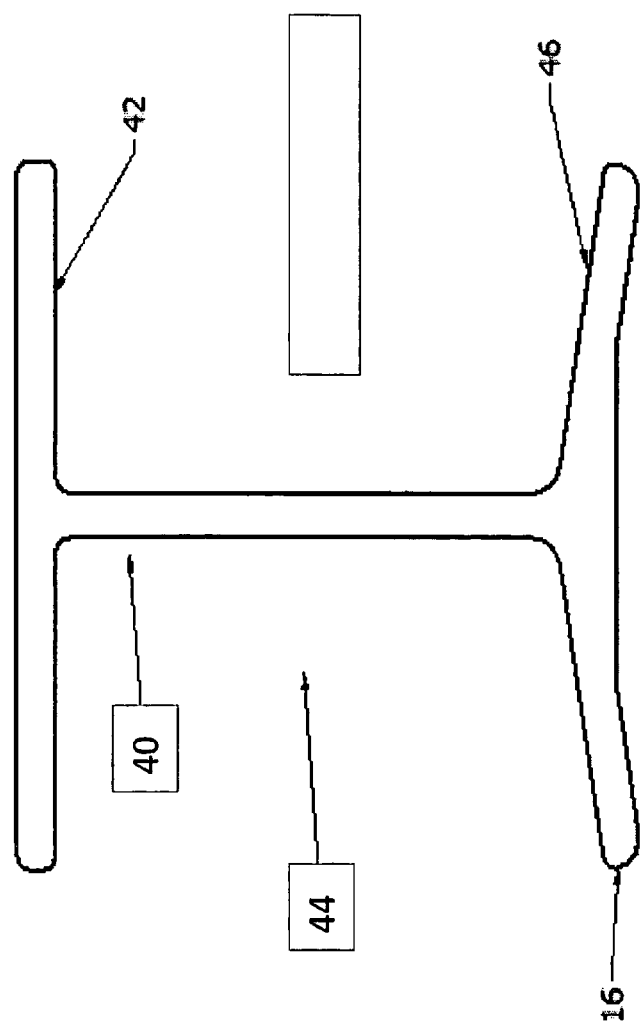
FIG. 8 shows the cross sectional profile of an extruded rib to be stretch-formed into a circular curve to become the "Rolling Rib".
Figure 9:
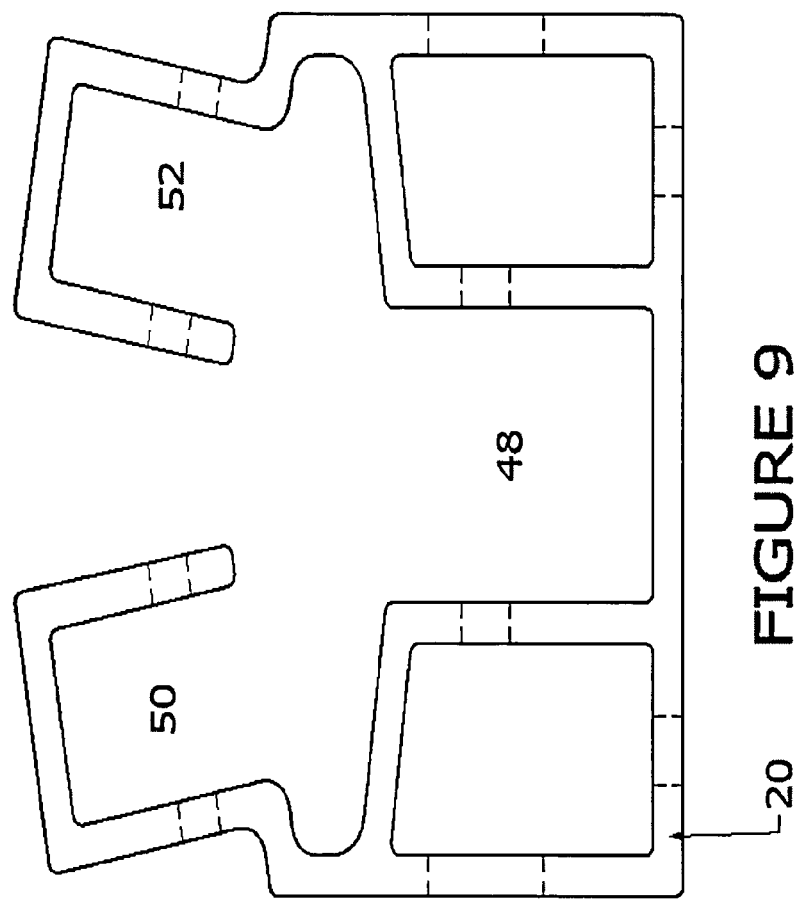
FIG. 9 shows the cross sectional profile of the extruded roller housings with holes for inserting shafts on which the rollers will turn.
Figure 10:
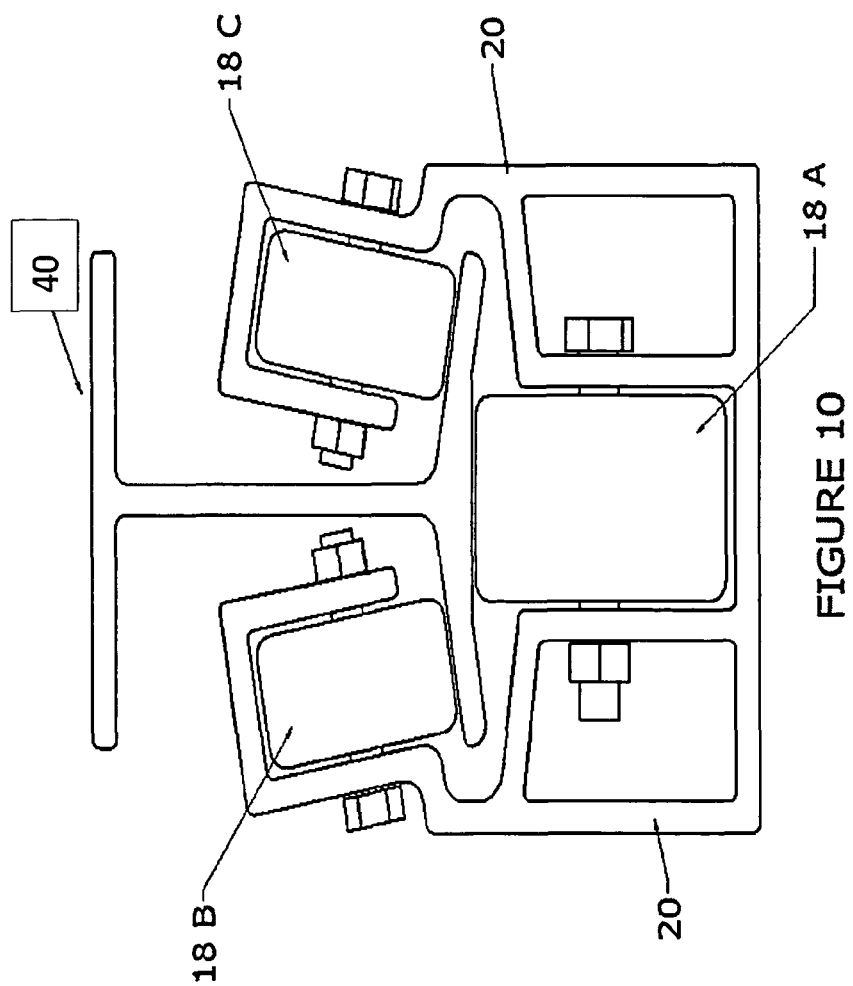
FIG. 10 shows the cross sectional profile of the extruded roller housing with the cross sectional profile of the "Rolling Rib" shown inserted and supported by one large roller underneath and two smaller rollers above.
Figure 11:
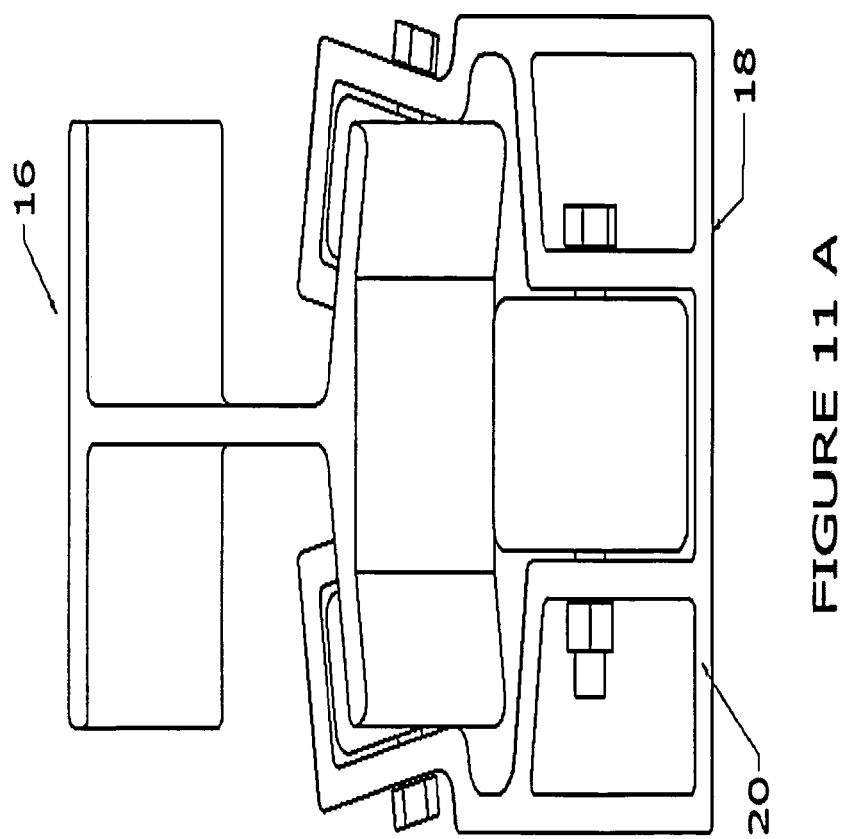
FIGS. 11a and 11b show a representation of a "Rolling Rib" showing the Rib bending upwards emerging from the housing with rollers.
Figure 11:
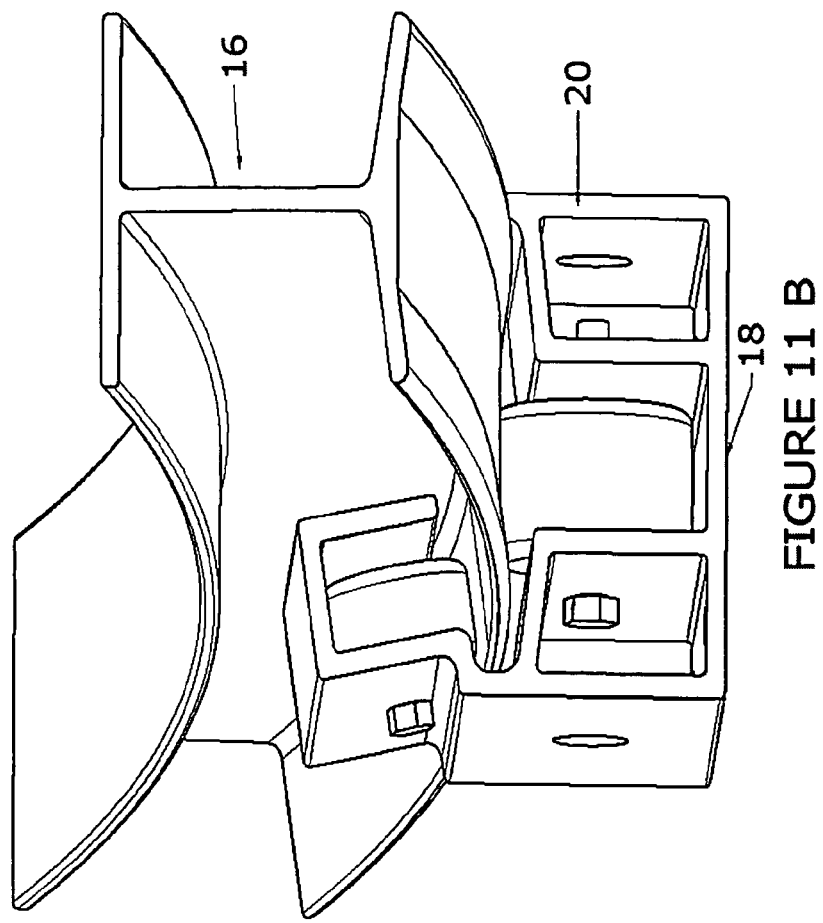

FIG. 8 shows an extruded rib 16 to be stretch-formed (or otherwise formed) into a circular curve. The top surfaces of the bottom flange are angled to help allow dust and debris to slide off. FIG. 9 shows extruded roller assembly 18 housings 20—cross sectional profile which would be cut to length—to support one bottom roller 18a and two top rollers 18b and 18c to guide curved "rib" 16. In the design discussed, there will be four of these roller housings 18 for each "rib" 16. The housing 20 has a first segment 48 in which the first roller 18a is disposed, a second segment 50 in which a second roller 18b is disposed, and a third segment 52 in which a third roller 18c is disposed. FIG. 10 is a cross section of curved "rib" 16 inserted into one roller assembly 18 with housing 20 with rollers 18a, b and c shown constraining it.

Figure 12:
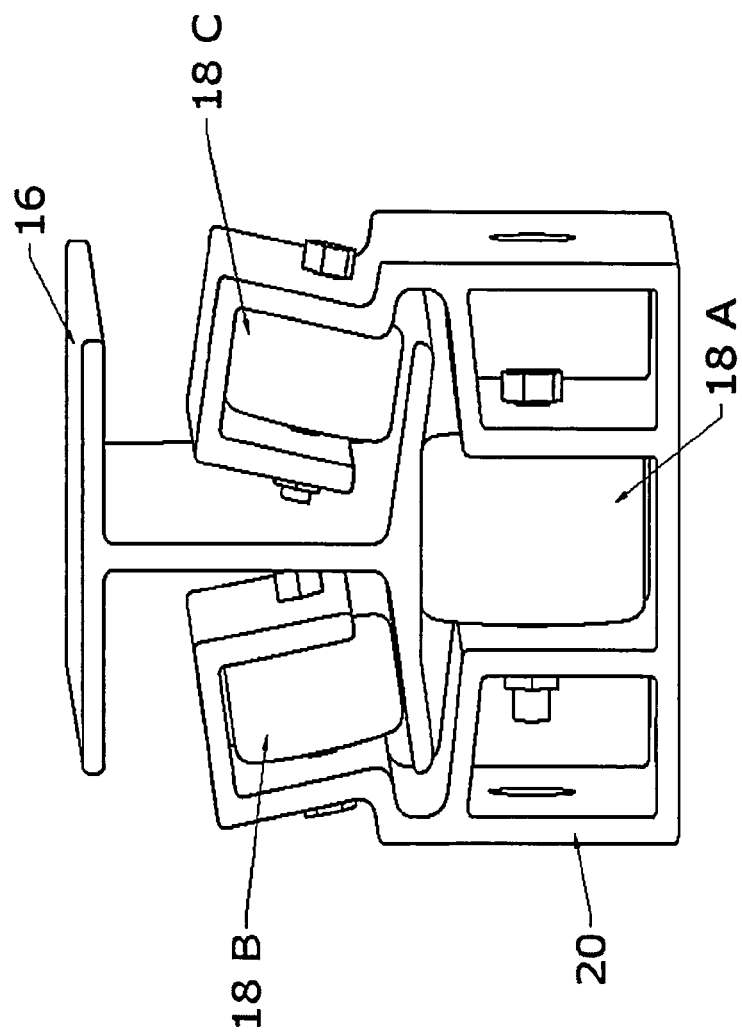
FIG. 12 shows a short section of a "Rolling Rib" system with rollers.
Figure 13:
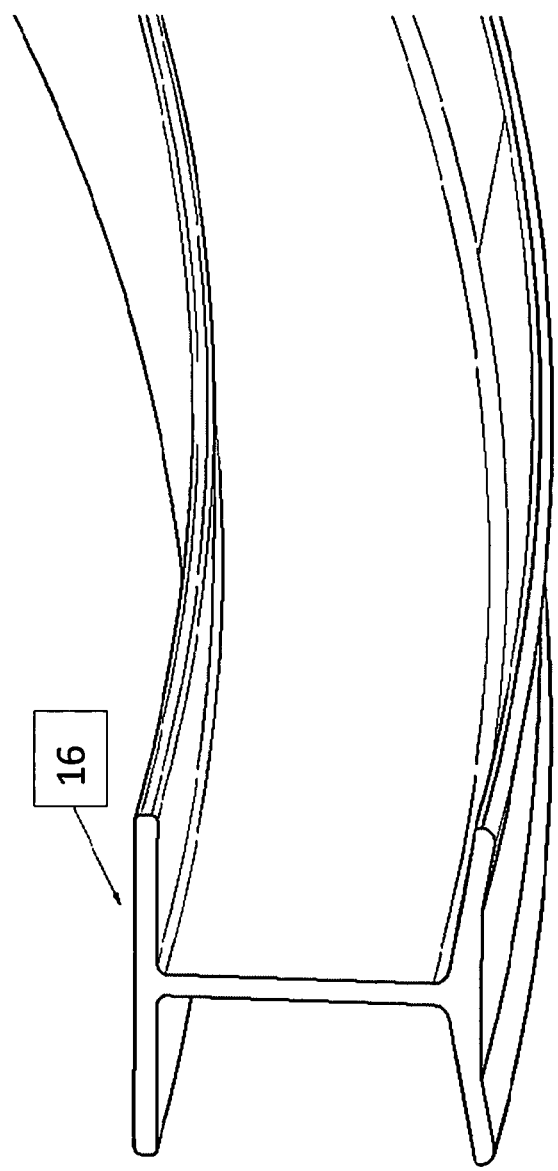
FIG. 13a shows a curved rib.
FIG. 13b shows the rib supported by one roller assembly.
Figure 13:
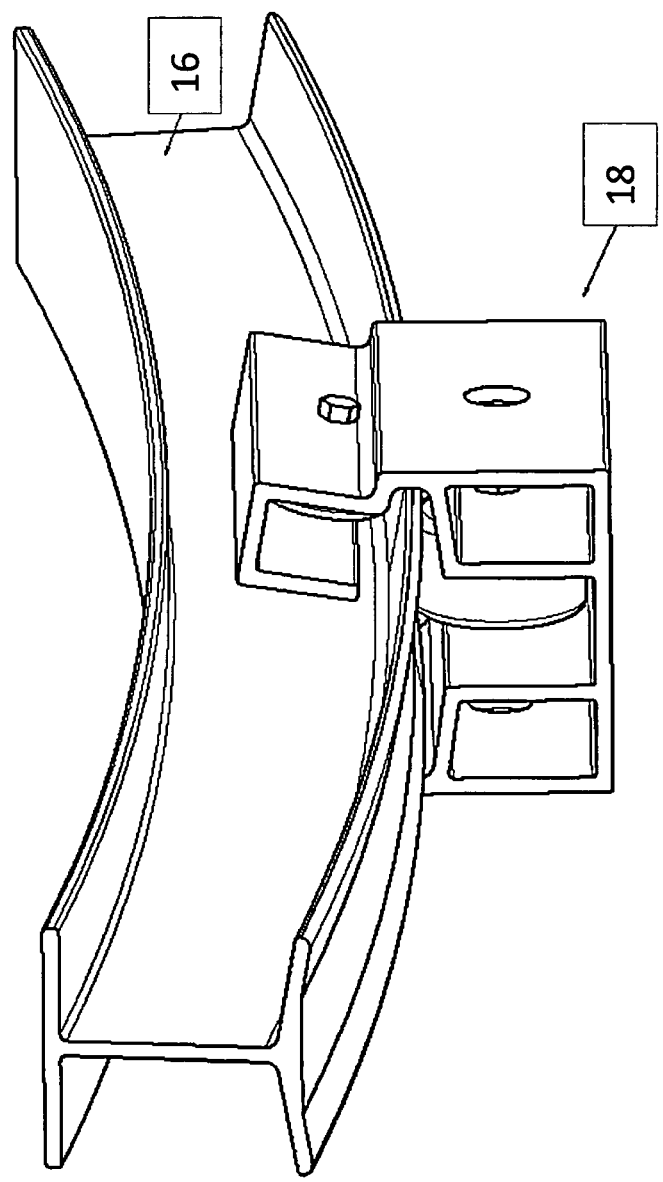

FIGS. 11a and 11b show a representation of a "Rolling Rib" showing rib 16 bending upwards. Note that the two ends of the rib 16 will be beveled (not just cut straight across as shown in the figure) so that the surface of the rib 16 approaching the roller 18 is guided into position by the combination of the curvature of the roller 18 and the beveled rib 16 end. FIG. 12 shows a "Rolling Rib" system with wheels 22 or rollers 18. FIG. 13a shows a curved "rib" 16. FIG. 13b shows the "rib" 16 supported by one roller assembly 18.

Figure 14:
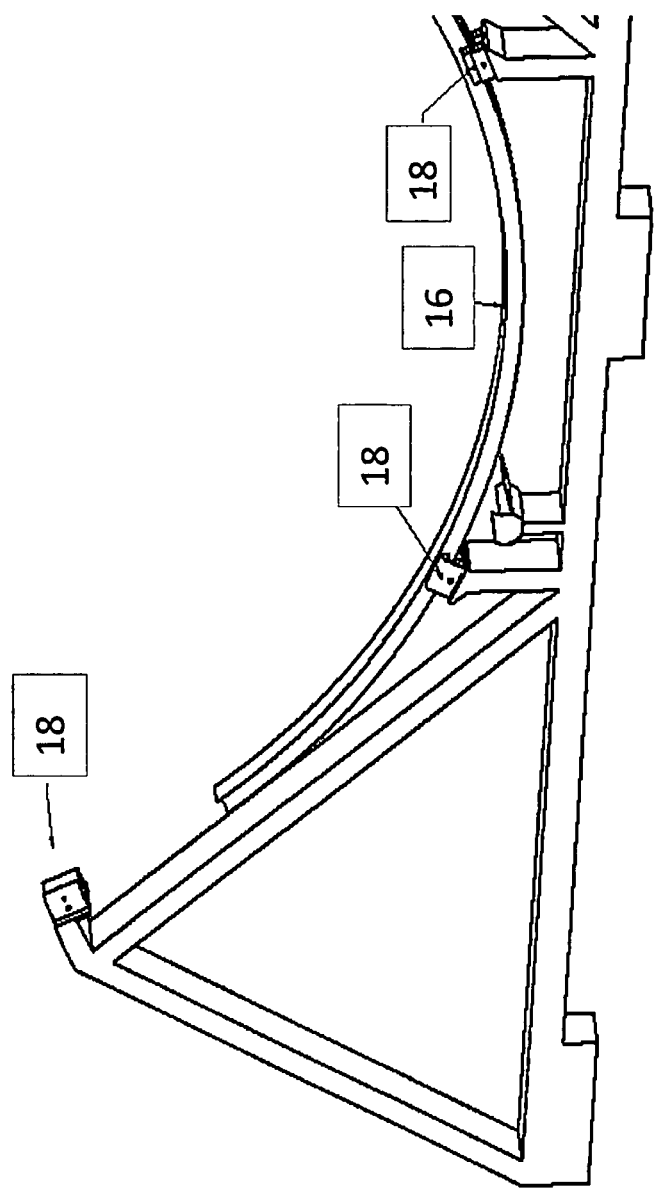
FIG. 14 is a representation of three (3) of the four (4) roller assemblies on a support structure with the bottom two "constraining" the curved "Rolling Rib" I-beam.
Figure 15:
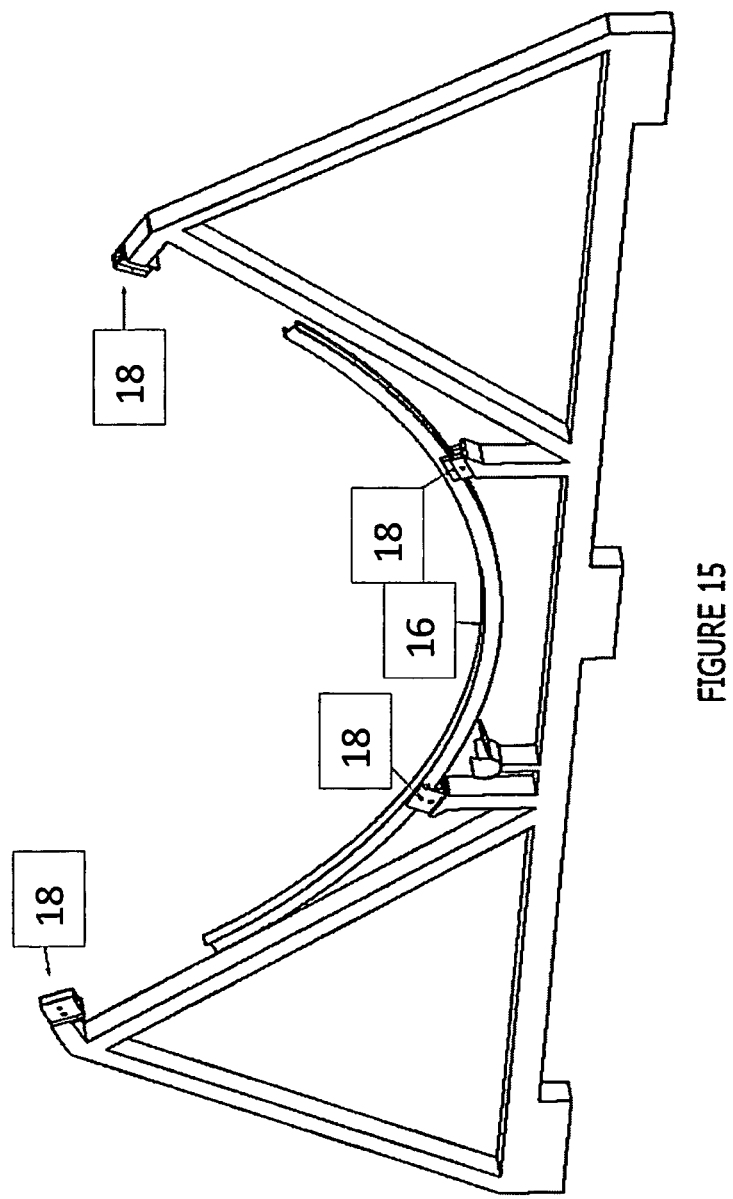
FIG. 15 is a representation of a "Rolling Rib" device shown at a greater rotated angle with the bottom two of four roller assemblies shown "constraining" the curved I-beam.

FIG. 14 is a representation of three (3) of the four (4) roller assemblies 18 on a support structure with the bottom two "constraining" the curved I-beam 16. It should be noted that the actual support frame 14 will not be made up of square members as depicted, but will likely utilize structural aluminum extrusions or other materials. Also note the water collection "gutter" next to the left most roller assembly 18 (discussed below); this gutter 28 will of course not just be a short cross section but will extend the full length (12 meters in this case) of the mirror 12. FIG. 15 is a representation of a "Rolling Rib" device shown at a greater rotated angle.

Figure 21:
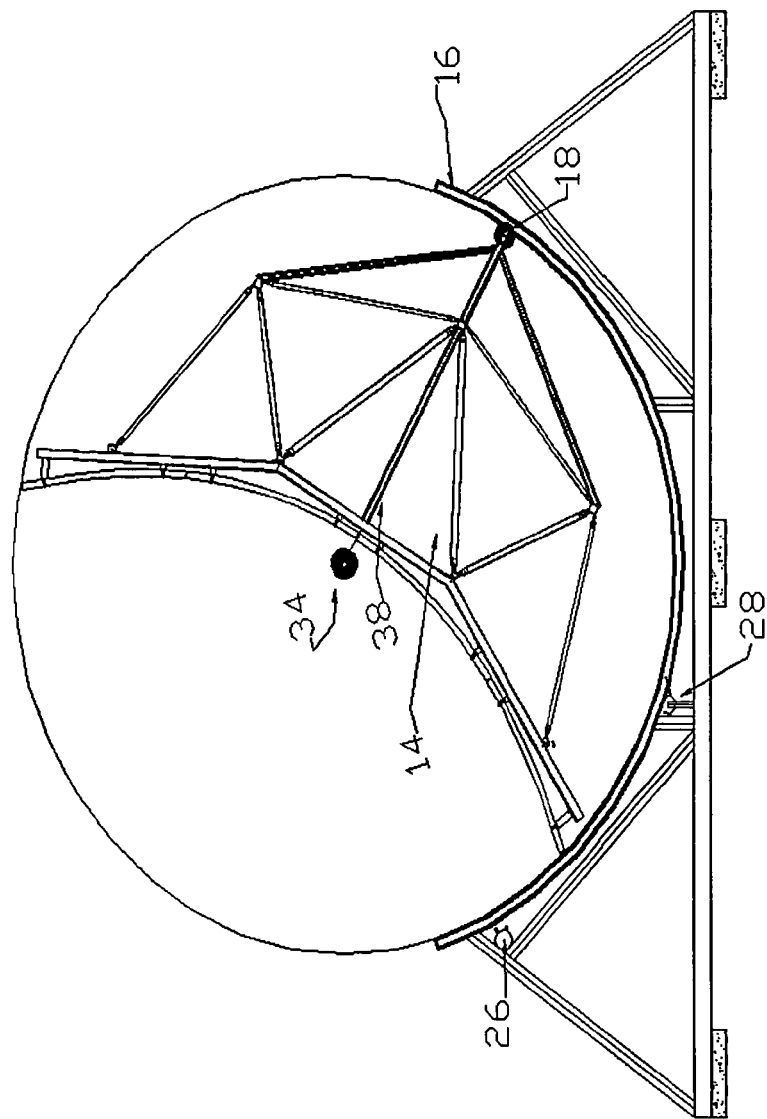
FIG. 21 shows an alternative "Rolling Rib" design, where roller assemblie(s) are attached to the bottom of the solar frame (by additional trusses or directly to the solar frame if geometry permits), and the "rib" is attached to the footings framework.

The design divides up the long spans (8, 12, 16, . . . meters) by using one or more of these circular "ribs" 16 under the solar frame 14 (alternatively, the rollers could be mounted to the solar frame 14 and the ribs 16 could be mounted to the ground through a structure, although this might lead to more dust/dirt collection in the ribs 16) (see FIG. 21). For example, a 12 meter long frame 14 might have one "rib" 16 in the center, essentially partially breaking the span into two 6 meter spans (the end supports would be at 12 meters but the center "rib" 16 would support much of the weight and wind load). A 12 meter frame 14 could of course also have 2 or more ribs 16, although as currently designed, each rib 16 requires between two and four extra footings in the ground (two could be used with an I-beam 32 spanning them to provide the attachment surface for the roller assemblies 18 (currently shown as four roller assemblies 18 per solar frame 14 "rib" 16, but could be as few as one or as many as desired). See FIGS. 16a, 16b and 16c.

The ultimate goal is to allow the "rib" 16 base of the solar frame 14 to transmit some of the load through the roller 18 assemblies to the foundations in the ground, reducing the forces and deflection on the frame 14, and thus improving the optical alignment, performance and resistance to damage due to high wind loads. For example, for a 16 meter frame 14, there might be two "ribs" 16 breaking the spans into thirds. For a 12 meter frame 14, if there were only 1 "rib" 16 centered, if it were to be positioned such that there weren't struts 30 directly above it for the specific current "Series 5" design, there might be an additional vertical strut 30 dumping the load from the mirror 12 through the mirror 12 supports more directly into the "rib" 16 and roller assemblies 18 into the footings (see strut 30 shown as 38 in FIG. 17a), which is why the extra center vertical strut 38 is shown for the 12 meter design (see the top of FIGS. 16a and 16b).

Figure 16:
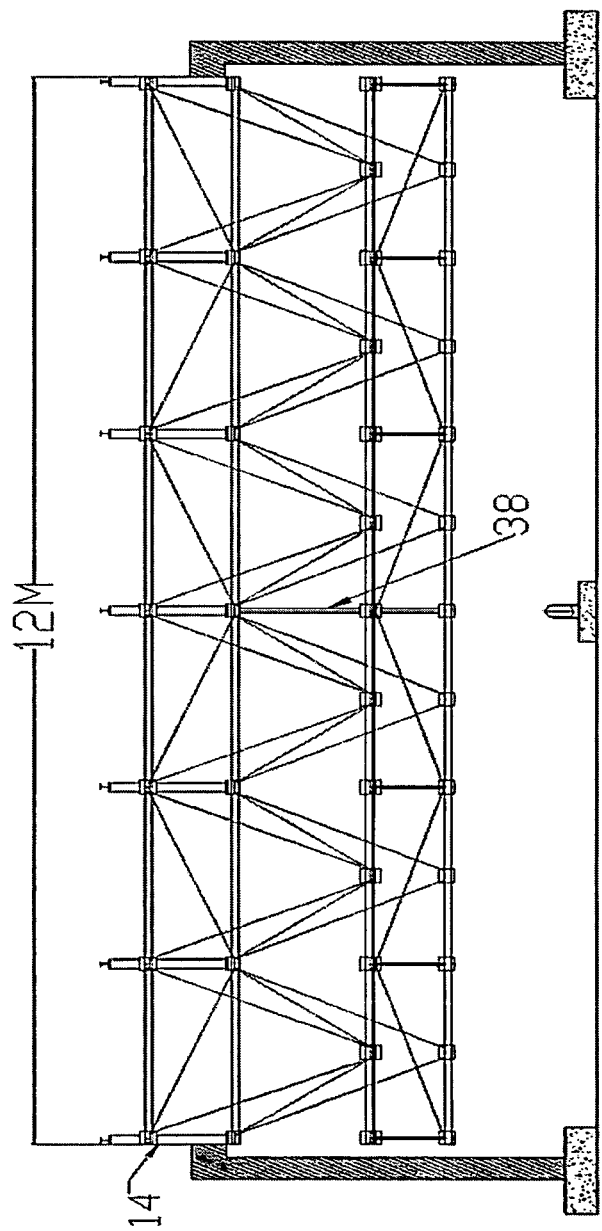
FIGS. 16a-16c show side views of a design of a Parabolic Frame in 12 meter and 16 m configurations.
Figure 16:
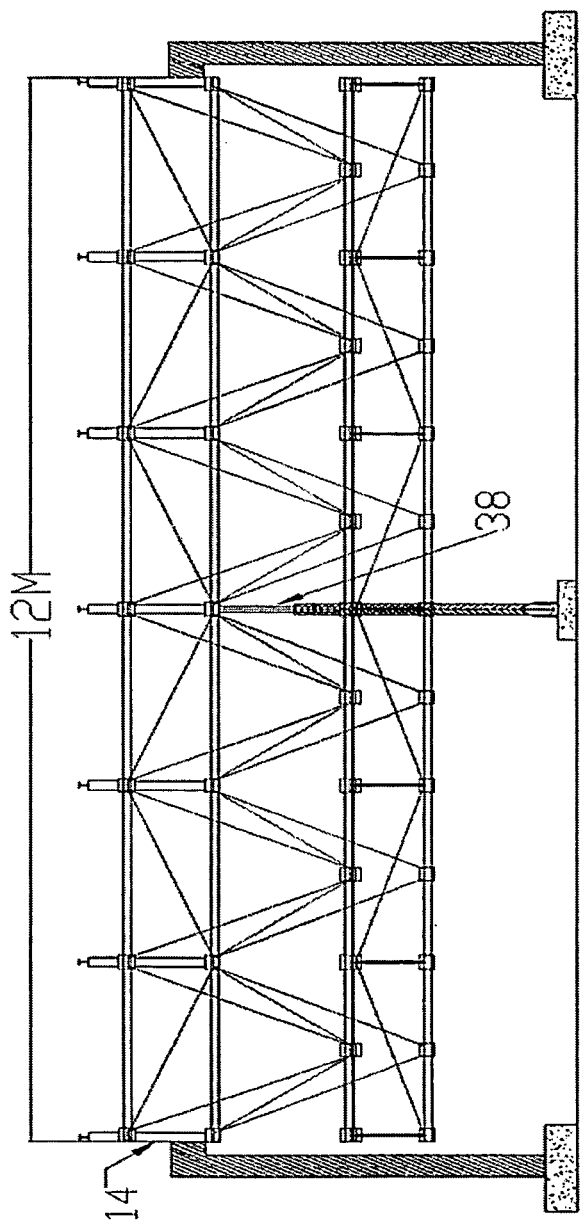
Figure 16:
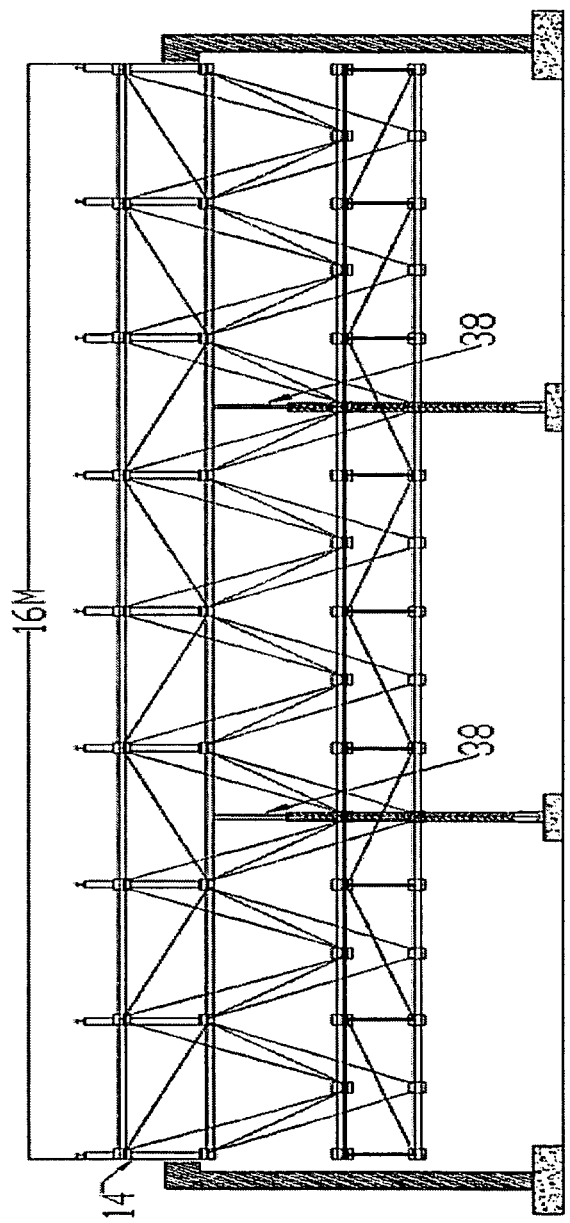

FIGS. 16a-c shows a Side View of design of Parabolic Frame 14 in 12 meter and 16 meter configurations. FIG. 16a shows that if the "Rolling Rib" design is to be used in the center of the span for a 12 m frame, an extra center support 38 should be added. (In FIG. 16b, the "Rib" 16 is shown, but it partially obstructs the view of the extra support rib 16). FIG. 16c illustrates how multiple "Rolling Ribs" may be used to further break longer spans into shorter sections, each of which will have less deflection under load (weight & wind, for example).

Figure 17:
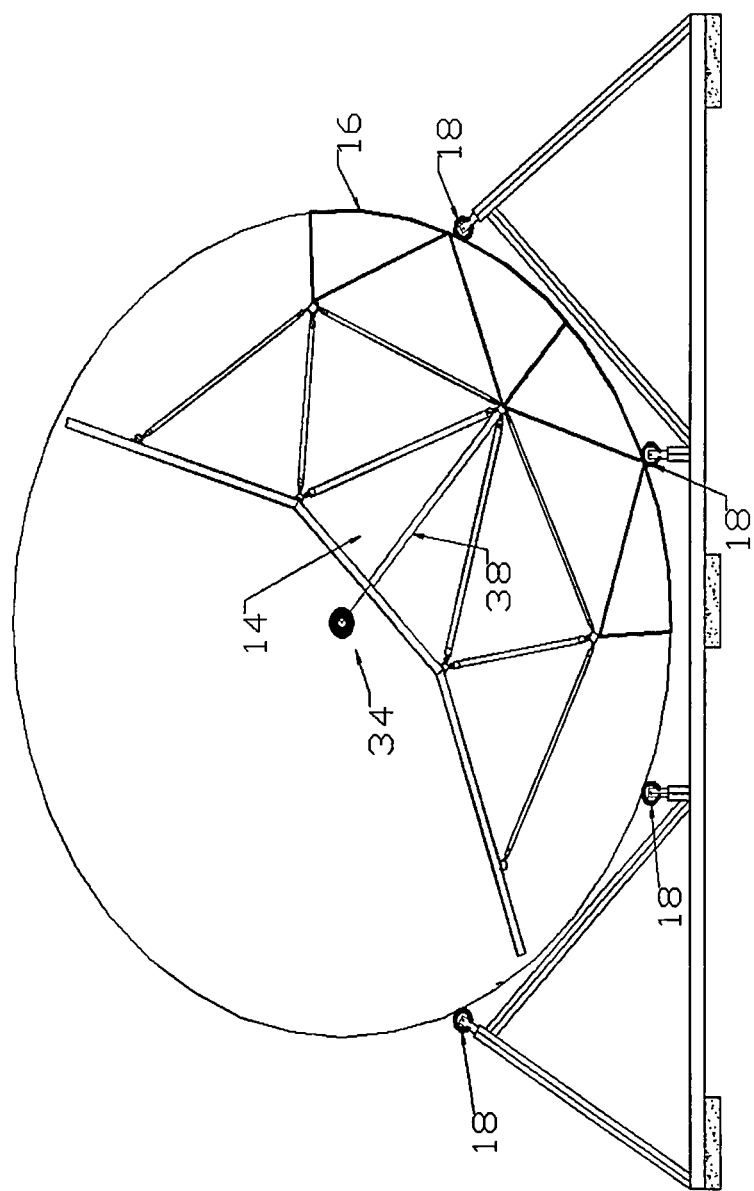
FIG. 17a is a "Rolling Rib" design with four rollers & frame. Note that the roller assemblies are depicted as a single bottom roller only for clarity—top rollers would likely be included as well to counteract wind forces acting on the back of the parabolic mirrors.
FIG. 17b is a "Series 5" geometry of frame design with curved extrusion "Rolling Rib" attached underneath via truss-like structure and four simple circles depicting roller assemblies supporting it.
Figure 17:
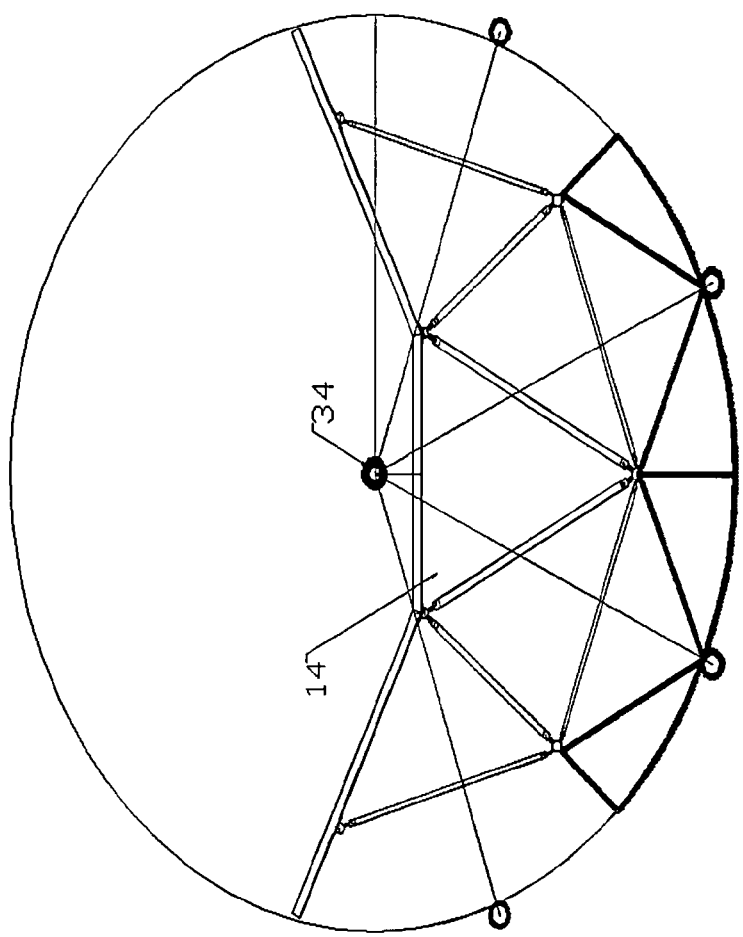

FIG. 17a is a "Rolling Rib" design with four roller assemblies 18 and an extra vertical strut 38. FIG. 17b is a frame 14 design with curved extrusion "rib" 16 attached underneath via a truss-like structure; the bottom is shown in black with drive wheels of a gear driven mechanism (discussed below).

Figure 18:
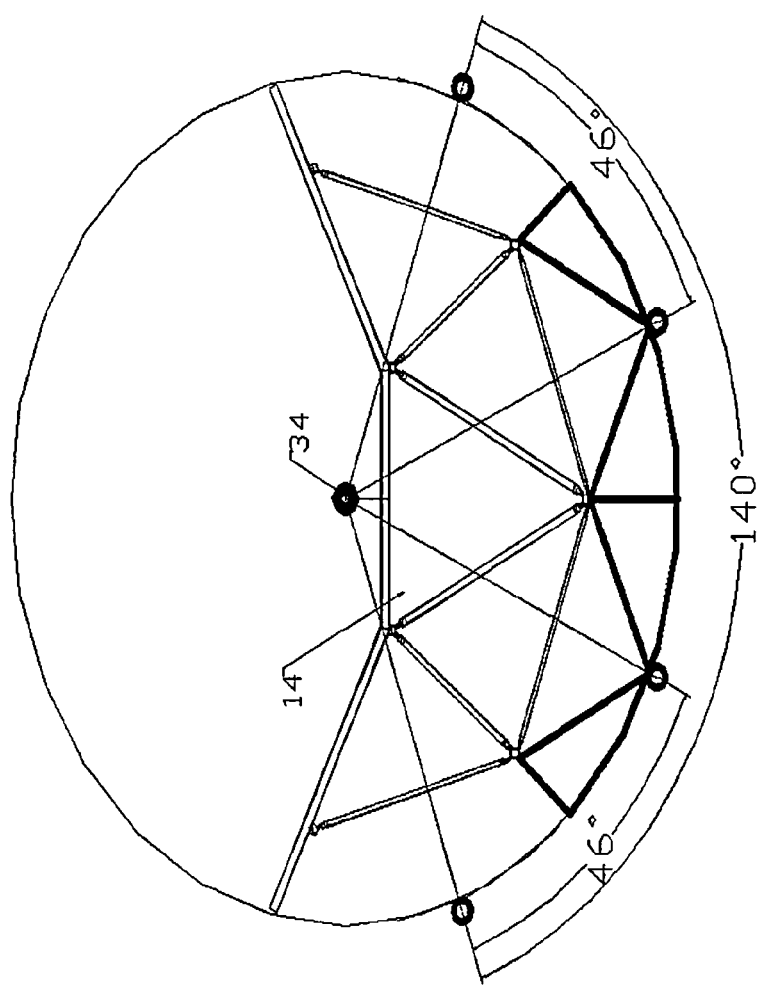
FIG. 18a shows the orientation of the "Rolling Rib" (95 degrees of the circumscribing circle) with four (4) rollers depicted placed to support the frame upon rotation.
FIG. 18b shows the "roller" engagement when the frame is rotated 18 degrees (2 roller assemblies supporting the frame).
Figure 18:
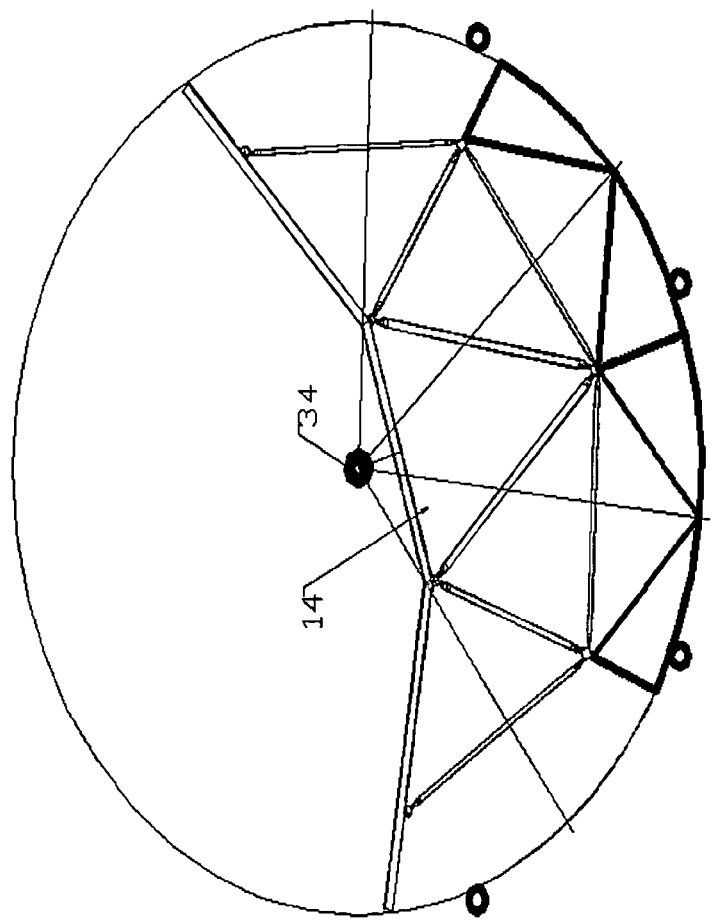
Figure 19:
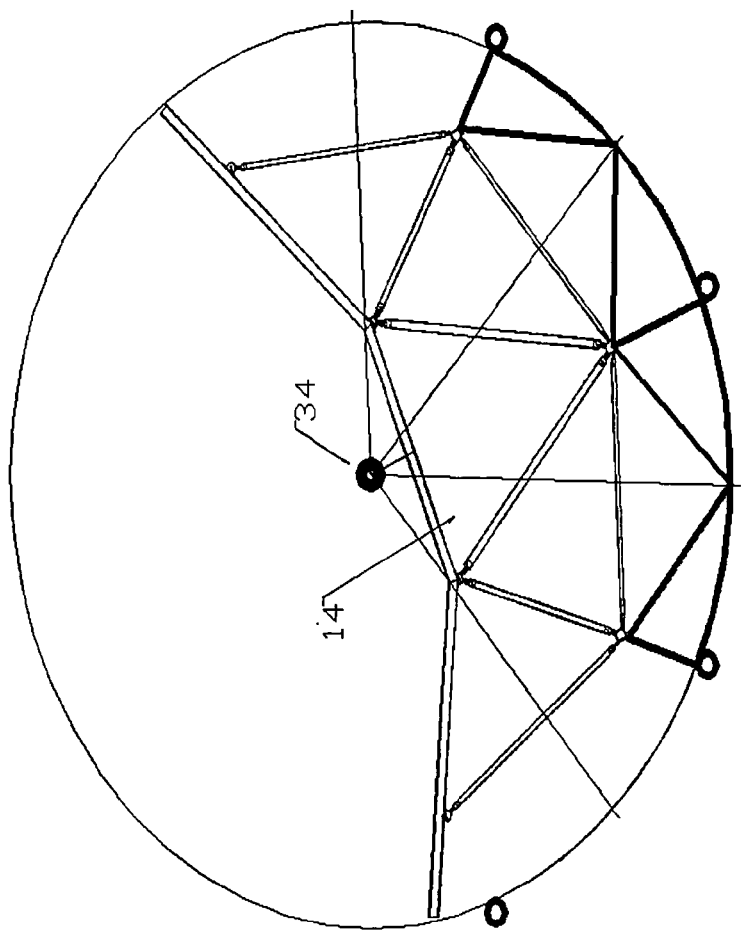
FIG. 19a shows at 23 degrees of rotation, three (3) roller assemblies are "engaged" supporting the frame.
FIG. 19b shows at 47 degrees of rotation, two (2) roller assemblies are "engaged" supporting the frame.
Figure 19:
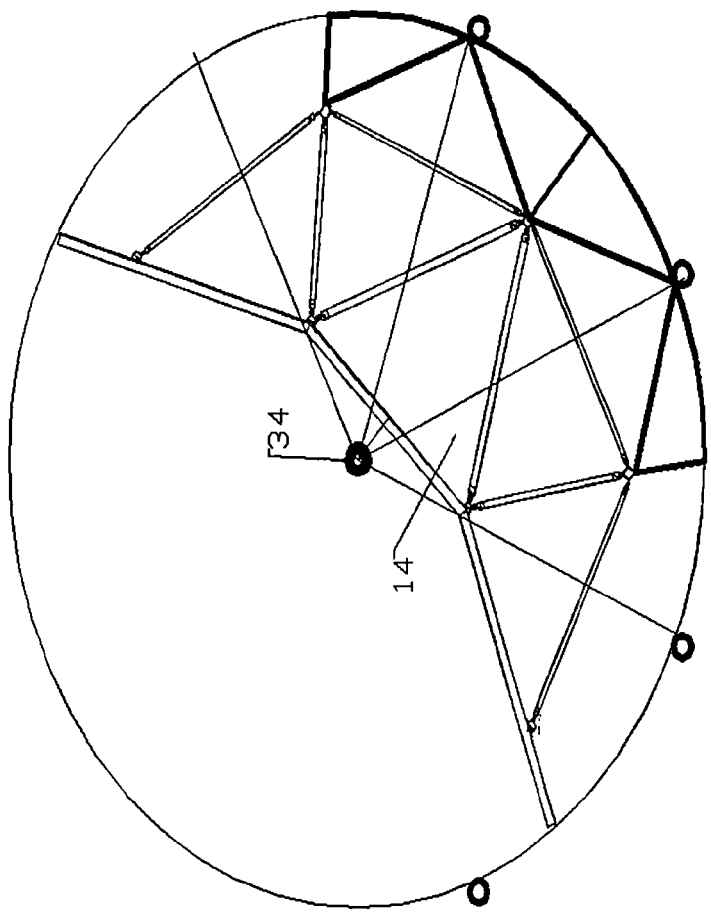
Figure 20:
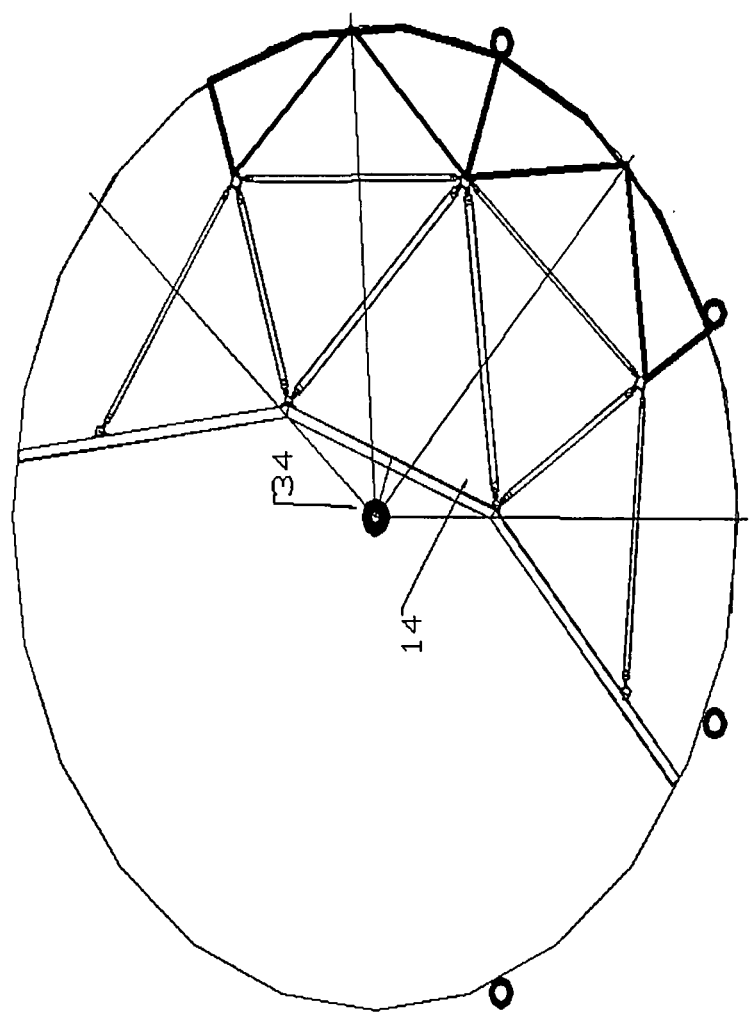
FIG. 20a shows at 70 degrees of rotation, two (2) roller assemblies are "engaged" supporting the frame.
FIG. 20b shows after 70, and certainly at 90 degrees of rotation, only one (1) roller assembly is "engaged" and supporting the frame.
Figure 20:
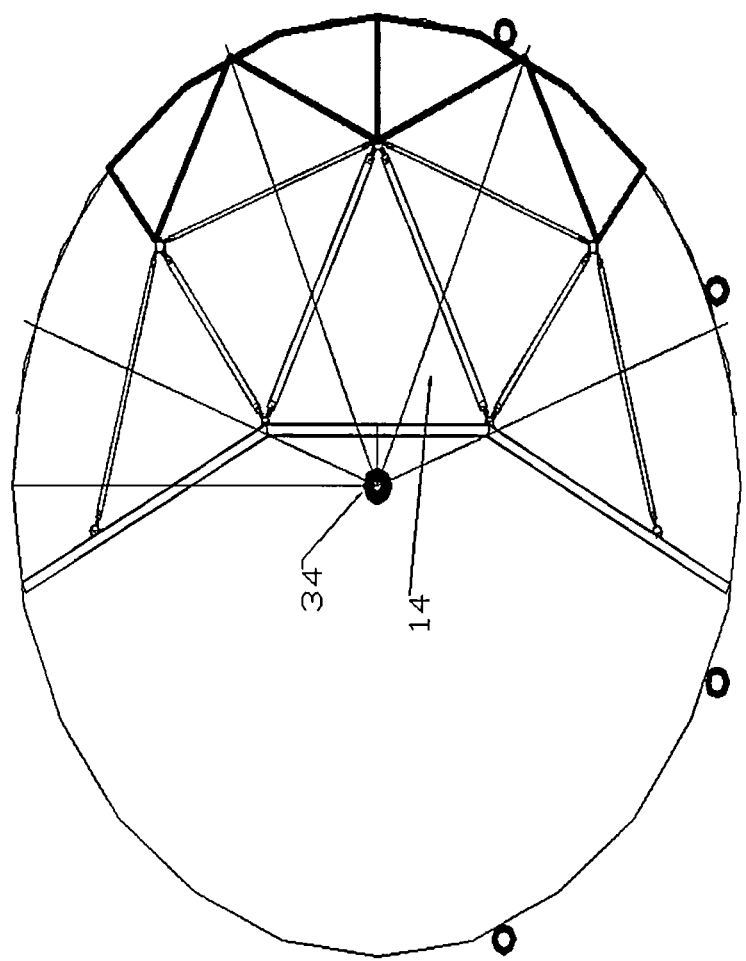

FIG. 18a shows the orientation of the "Rib" 16 (95 degrees of the circumscribing circle) with four (4) roller assemblies 18 placed to support the frame 14 upon rotation; FIG. 18b shows the "roller" engagement when the frame 14 is rotated 18 degrees (2 roller assemblies 18 supporting the frame 14). FIG. 19a shows the same at 23 degrees of rotation, with three (3) roller assemblies 18 "engaged" to support the frame. FIG. 19b shows the same at 47 degrees of rotation, with two (2) roller assemblies 18 engaged to support the frame 14. FIG. 20a shows the same at 70 degrees of rotation, two (2) roller assemblies 18 engaged to support the frame 14. FIG. 20b shows the same after 70, and certainly at 90 degrees of rotation, with only one (1) roller assembly 18 engaged to support the frame 14.

FIG. 21 shows an alternative "Rolling Rib" design, where roller assemblie(s) 18 are attached to the bottom of the solar frame 14 directly or through intermediate structural pieces and the "rib" 16 is attached to the footings framework. This simplifies the design but may have issues with dust/debris on the "rib" 16 track. A similar "roller assembly" can be used to that described elsewhere. There is a gutter system shown for mirror cleaning water reclaim. The gutter 28 cap 58 can be fixed or have the ability to rotate by water pressure actuators or by lever action to cover the gutter and keep sand, dirt or debris from accumulating.

Figure 22:
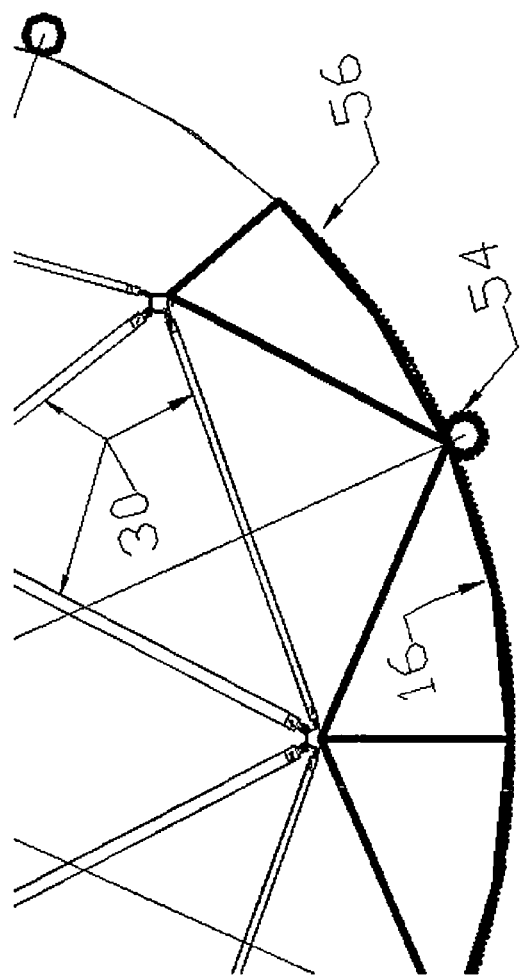
FIG. 22 shows a rack/pinion drive design for a "Rolling Rib".

A drive design (may be additive to or instead of the above advantages) is shown in FIG. 22. The bottom surface of the "rib" 16 could be equipped with a "rack" 56 attached to the rib 16 such that a "pinion" gear could drive the rotation of the unit from a hydraulic motor or any other device providing rotational forces. FIG. 22 shows a rack 56/pinion drive 54 design for a "Rolling Rib" 16 design. Currently, the CSP frames 14 are often driven from a single drive mechanism operating two, three, four or more frames 14 on either side of the drive unit. The frame 14 furthest from the drive unit is free to rotate on one end and rotated into the correct position to face the sun by a connection to the next frame 14 closest to the drive mechanism. This frame 14 thus sees torque on one end, as in turn rotated by the NEXT frame 14 closest to the drive mechanism. The final frame 14 directly attached to the drive mechanism is thus subject to not only any torques induced by wind loads on itself, attempting to turn it from perfect focus on the sun, but also to the torques from ALL of the other frames 14 driven by it (n−1 frames 14 worth of torque is applied to one end of it, and the other end is attached to the drive motor). The concept of using a shaft drive or other means rotating the pinion gear 54 under each curved gear rack 56 attached to/part of some or all of the curved ribs 16, totally eliminates the torque applied to all frames 14 from other frames 14, allowing for lighter, more efficient structural designs of frames 14; the "drive torque" is separated from the wind torque of each individual frame 14.

Use of the "Rolling Rib" to enhance security of solar frames during high wind conditions:

Concentrated Solar Power frames can be used in areas with high wind loads (hurricanes in Florida, dust storms in the plains, etc.). The incorporation of a modified "Rolling Rib" provides additional protection from damage in these installations. The concept is to extend the "Rolling Rib" to part or all of a full 360 degree circle (currently shown as approximately 97 degrees in the prior pages). To accomplish this, it is likely that the "360 degree circle" could be made up of two or more partial segments, connected together (this is a simpler way to stretch-form these large structures, although similar aluminum extruded bicycle wheels have been fabricated for decades). It is also likely that the "rib" 16 would need additional support for stabilization (structural piece 38 shown in FIGS. 31 and 32).

Figure 32:
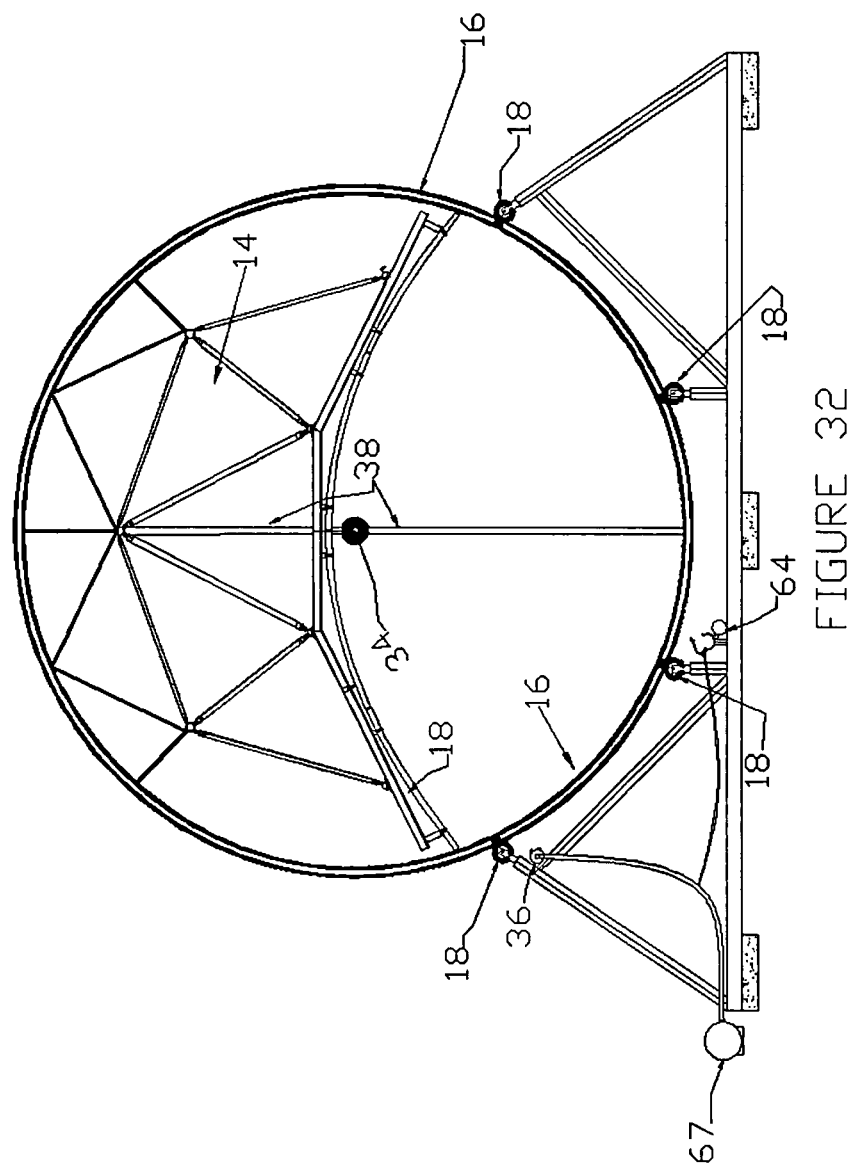
FIG. 32 shows a "360 degree rib" shown with parabolic mirror pointing straight down, with the 360 degree "Rolling Rib" continuing to provide support through all four (4) roller assemblies.

The "360 degree rib" (named to indicate that the rib can extend to encompass up to the full circumference of the rotational path) enables the solar frame 14 to be stored in any position deemed ideal for particular expected wind conditions (for example, the parabolic mirror could be stored facing the earth as in FIG. 32 assuming clearance for all members (including the absorber tube)). The wind loads would act on the mirrors 12, and through the mirror supports onto the solar frame 14; as discussed previously re: the "Rolling Rib" design, the forces which on other solar frames are transmitted only through the pivot points 34 at each end of the solar frame 14 can now also be transmitted from the "rib" 16 to the roller assemblies 18, which are mounted on frameworks with foundations.

As an example, if during a hurricane, the solar frame 14 is stored pointed downward (avoiding wind, rain and hail on the reflective surface of the parabolic mirrors 12), the solar frame 14 system could still be subject to wind gusts treating the parabolic mirror as a "wing" and creating lift, or from gusts pushing upwards on the system. Without the "360 degree rib", the resistance to this upwards force occurs purely from the solar frame 14 "truss" structure into the two (2) end pivot points 34, themselves attached through uprights into a foundation. With the "360 degree rib", installed in one or more locations, the upwards (or other) forces are distributed among the two (2) end pivots/foundation and the rib/roller assembly/frame/foundation location(s). Besides spreading the load among three (3), four (4) or more (vs. only two (2)) locations, the "360 degree rib" dramatically reduces the loading, stress and deflections inherent in utilizing the solar frame 14 truss structure alone with the two (2) pivot points 34 currently used on these solar frame 14 designs; this in turn leads to less damage, including mirror breakage, due to excessive wind conditions.

The "360 degree rib" system also lends additional support to the solar frame 14 no matter the orientation, as the "rib" engages with all (four (4) as shown in these sketches) roller 18 assemblies. Looking back at FIGS. 18a-20, depending on the orientation of the solar frame 14, the "Rolling Rib" design engages three (3), two (2), one (1), or in non-use positions (pointing toward the ground for example), even zero (0) roller assemblies.

Figure 31:
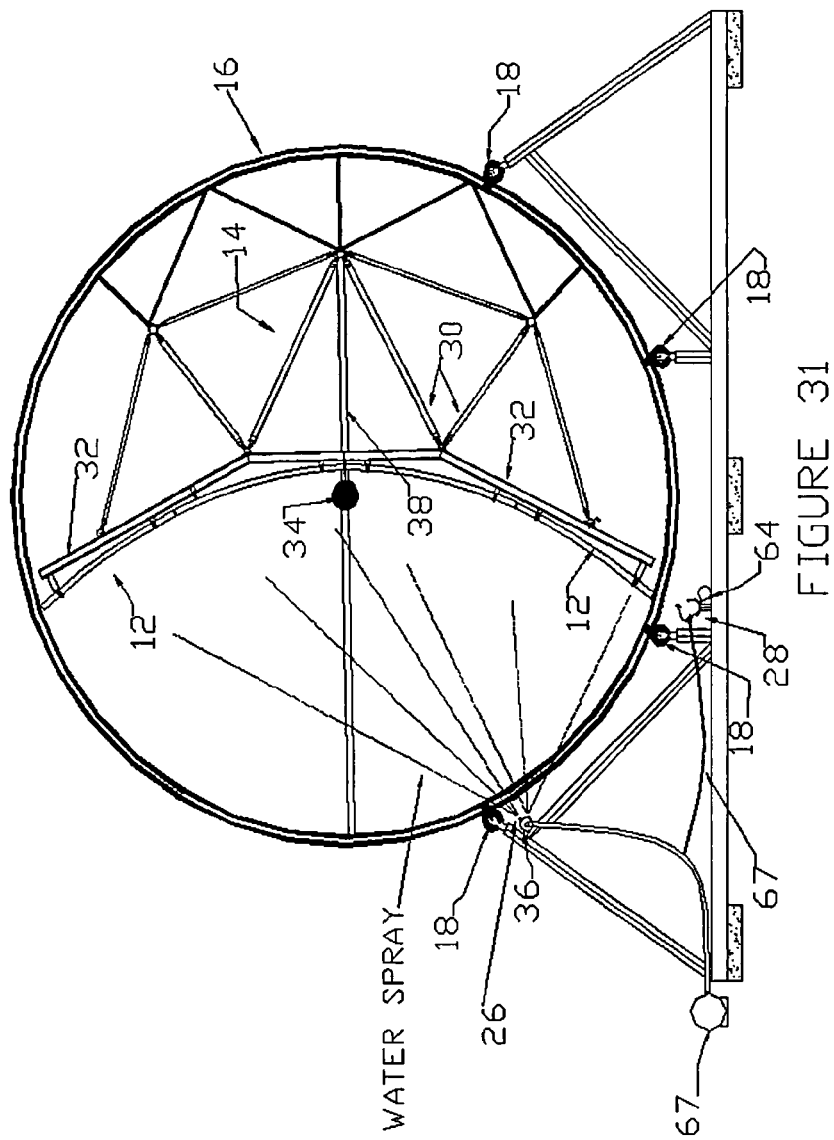
FIG. 31 shows a "360 degree rib" design showing the solar frame in a sideways position.

FIG. 31 shows a "360 degree rib" design showing the solar frame 14 in a sideways position. FIG. 32 shows a "360 degree rib" shown with parabolic mirror pointing straight down, with "rib" continuing to provide support through all four (4) roller 18 assemblies.

The Mirror Washing/Water reclamation/"gutter" design (may be additive or instead of the above advantages):

The solar mirrors 12 must be washed periodically to retain their optical performance (dust and dirt degrades the performance); filtered "distilled" water (condensate from the steam turbines) is/should be used for this. Current designs use a truck which runs between the rows of solar mirrors 12, spraying a cleaning solution (from here on, just "water" will be used in the explanatory text) onto the mirrors 12; the water drips onto the ground and is absorbed or evaporates. This water becomes a "consumable", and in many areas, such as the desert installations, this "consumable" is in short supply and thus expensive.

Figure 23:
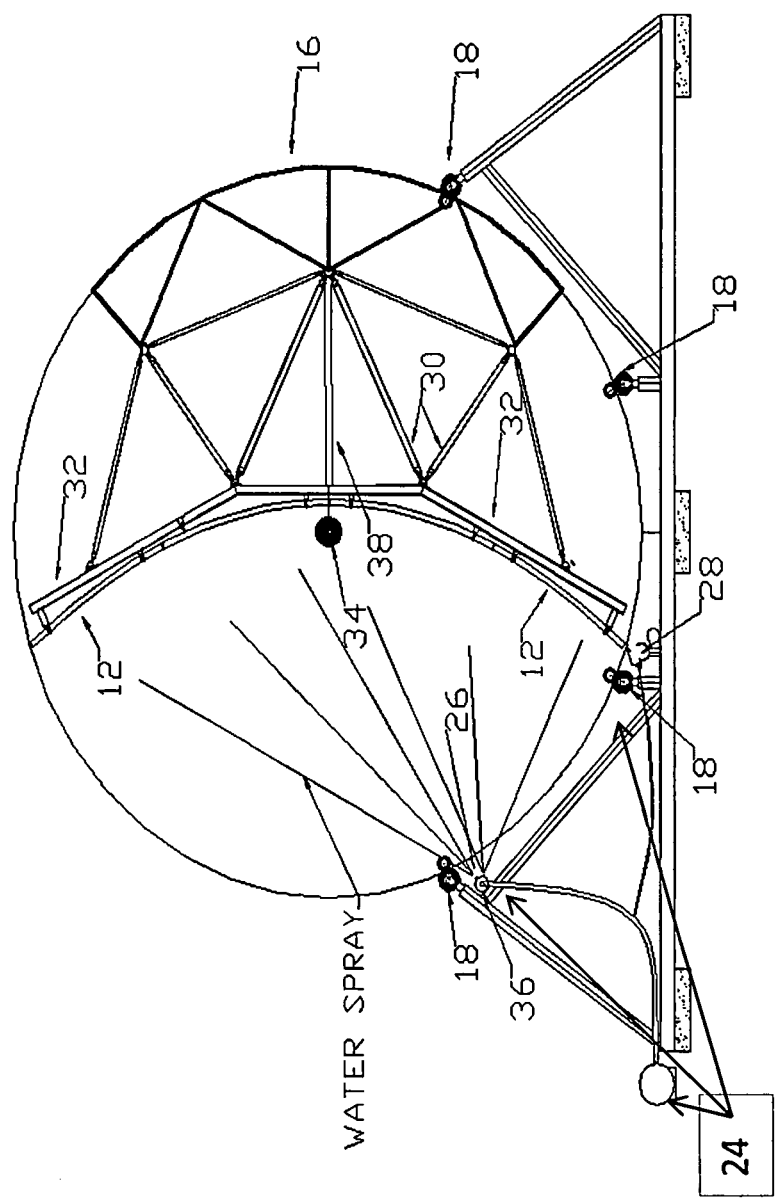
FIG. 23 shows a mirror cleaning and solution reclamation system. While this is depicted on a "Rolling Rib" system, it is equally applicable to other frame systems.
Figure 24:
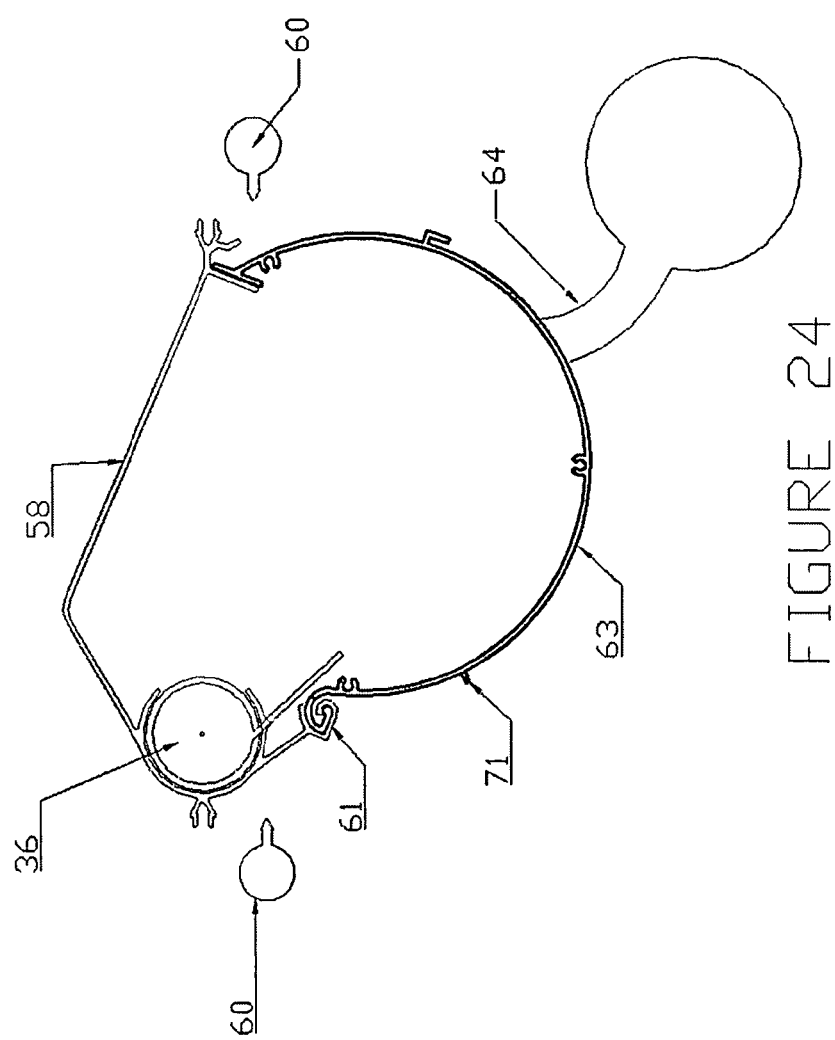
FIG. 24 shows a gutter with a closed cap.
Figure 25:
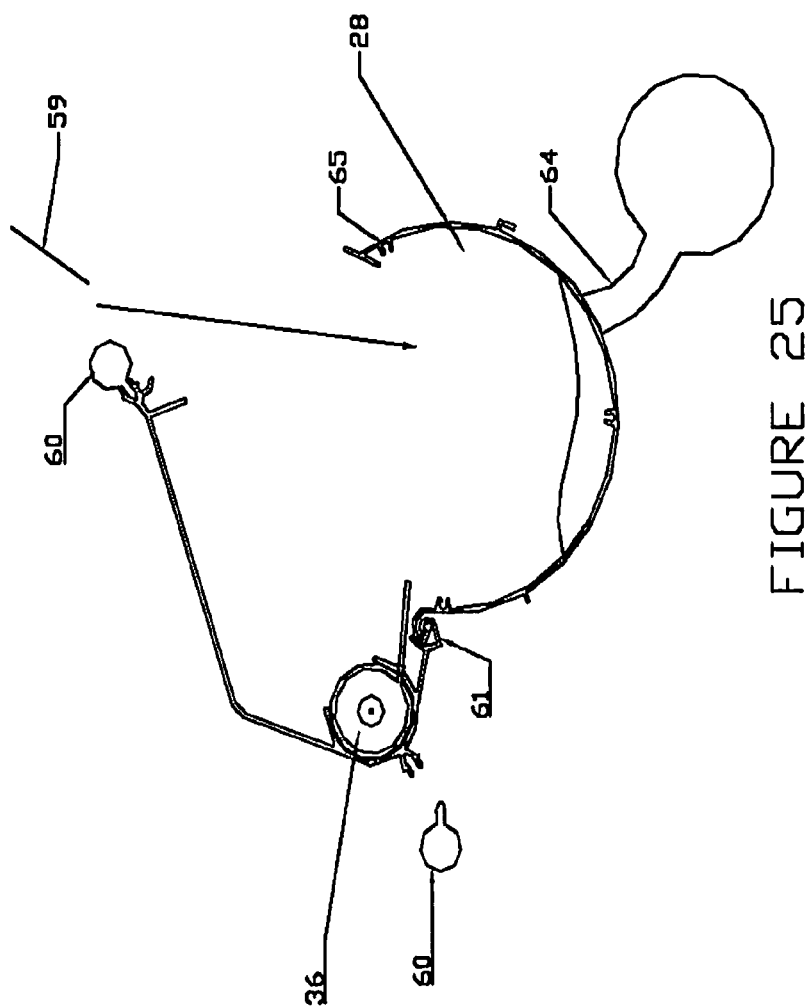
FIG. 25 shows a gutter with the cap open, with cleaning solution depicted dripping from the mirror edge into the gutter.

A gutter 28 on the frame 14 can be used to collect the water for reuse. The gutter 28 can be incorporated into the framework of the "Rolling Rib" design (although the same could be developed without the gutter 28); by using the framework, permanent nozzles and a gutter 28 system can be attached so that water can be automatically sprayed on the mirrors 12 (due to the width of the mirrors 12, it is likely that 2, 3 or more nozzle rows will be required; the top line might be deployed first, followed sequentially by those immediately below it.) See FIG. 23 for a high level overview of the design. FIG. 23 shows a mirror cleaning and solution reclamation system. The gutter 28 "cap" 58 can be fixed or have the ability to rotate by water pressure actuators or by lever action to keep sand, dirt or debris from accumulating. FIG. 24 shows a "gutter" 28 with "cap" 58 closed. FIG. 25 shows a "gutter" 28 with "cap" 58 open.

The water will be collected in the gutter 28, transferred to a central area, filtered and reclaimed for reuse. The gutter 28 would be designed such that when not in use collecting water, it is covered to keep it clean of dust, sand and other debris; see FIG. 24. The particular design shown uses a 12 meter gutter 28 (the length of the particular solar frame 14 it is designed for) with end caps attached to each end (the "gutter 28" extrusion has screw boss's 65 incorporated to facilitate the attachment of end plates; the end plates are sized to seal the "gutter" end and cover the space left open by the end view of the "cap" 58).

The "gutter" is mounted on the framework supporting the roller 18 assemblies as shown in FIG. 24; note that it is mounted with a slope so that the water runs to one end of the capped "gutter". Each 12 meter "gutter" is capped at each end and the collection of the water occurs at the lowest part of the slope of the unit, with a simple drain pipe 64 connecting the water flow from the "gutter", through a hole in the bottom of the "gutter" to a central water collection pipe 64 for each line of mirrors 12. These pipes 64 are then connected and drained (or suctioned, depending on the physical location of all components) into a central area where the water is separated (there is likely sand and other debris which will sink out or float up) and filtered for reuse. Water pressure pipe 36 capped at one end, pressurized/filled when water spray is actuated; this pressure tube fits into the "Cap" 58 and has a very small drain (dotted line) to allow it to drain into the "gutter" thus allowing the "Cap" 58 to swing closed once the water is no longer counterweighting it open. "Cap" 58 of the Gutter 28 (slanted to avoid sand/debris buildup). This slanted line 59 represents the bottom edge of the mirror 12 from which the water drips. The arrows show where the water will drip. When the "cap" 58 is closed, it sits on a positive stop of the "gutter" and resists any windblown dust/sand or other debris entering the "gutter". Snapfit Counterweight 60 (cut to length to adjust weight and joining "cap" 58 sections. Drain 64 from "gutter" into collection pipe 36 for solar field. "Gutter" base 63 (capped at either end with plates which seal it and cover the "Cap" 58 to avoid dust/sand/debris blowing in). The "gutter" 28 is mounted on a slope with a drain at the low end. There is an extruded hinge 61.

The "gutter" assembly includes an extruded "cap" 58 which is in place protecting the "gutter" from collecting dust, sand or other debris except when the water is being sprayed onto the mirrors 12. The "cap" 58 and "gutter" are designed with an extruded hinge. The "cap" 58 may be made up of cut sections placed end to end for the 12 meter length (trying to align a 12 meter length of "cap" 58 and "gutter" might be difficult, but the "cap" 58 can be slid on in shorter sections (for example, 1, 2 or 3 meters sections). See FIGS. 24 and 25. When the water pressure to the mirror spray nozzles turns off, the water in the pressurized/filled tube will slowly drain off through the dotted drain line into the gutter, allowing the cap to close. The extruded hinge 61 provides a hard "stop" to the rotation of the "cap" 58. Counterweight 60 "snapped"/secured to "Cap" 58. Screw bosses 65 for attaching "gutter" end plates.

This "cap" 58 is designed to be weighted at both ends. The end nearest the pivot point 34 includes a semicircular arc; once the "cap segments" are slid onto the "gutter" extrusion, a 12 meter water tube 36, capped at one end and threaded at the other for pressurized water is slid into these successive semicircular arcs, in effect making the individual "cap segments" into one "cap" 58. See FIGS. 24 and 25.

As the fluid pressure is introduced into the system 10 to supply the spray nozzles, there is a supply of water (via a simple "Y" in the supply line) to this 12 meter tube 36 so that it fills with water and becomes heavier than when it is empty. The "gutter cap" 58 extrusions/system is designed with this tube over center on the side of the pivot point 34 so that this extra weight from the filled tube causes the "cap" 58 to rotate, lifting the "cap" 58 off of the gutter to allow drainage water from the minor washing to run into the "gutter". Note that there is a small drain hole and pipe 36 between the lowest end of the pressure pipe 36 (which is sloped with the "gutter"), through the "gutter cap" 58 into the "gutter" area. While under pressure water will flow in small amounts through this into the "gutter"; the main purpose of this is so that when the pressure is released to stop the spray of water onto the minors 12, the pressure pipe 36 can slowly drain its water back into the "gutter" and become lighter as the pipe 36 empties, eventually allowing the "gutter cap" 58 to swing close, protecting the "gutter" from dust, sand and other debris. See FIGS. 24 and 25.

The end of the "cap" 58 opposite from the pivot point 34 is weighted to help it to swing closed when there is no water in the tube. The end has two "fingers" on it that go on either side of the "gutter" lip; the purpose of these is to help reduce the incidence of the wind blowing sand, dust or other debris under the "cap" 58 and into the "gutter". This end of the "cap" 58 is also designed so that an extruded aluminum weight can be cut to length, slid onto a single "gutter cap" 58 length or between two, joining the two, and "squeezed" (or alternatively, "snap fit" onto the "cap(s)" to provide the counterweight 60 to the pressure tube end. This is similar to how lead weights are squeezed onto a fishing line. The "snap fit" design is common to aluminum extrusions, and is what is shown in FIG. 24. The aluminum extrusion is pushed onto the mating piece and the interlocking "wedges" "snap" close (this is a simple, secure, attachment means for a design element like an extruded "gutter cap" 58 counterweight 60). Note that a similar design element is included on the water tube side to enable counterweight 60 adjustments if required (similar to balancing automotive wheels with lead weights). See FIGS. 24 and 25.

The above design describes using counterweights 60 and the weight of the water to accomplish the rotation of the hinged "cap" 58 off of the "gutter" to allow water from the mirror 12 to run into the gutter 28. This rotation could also be accomplished mechanically by linkages, lever action or other means; actuation could be accomplished via water pressure (perhaps filling bladders which create the force to rotate the gutters 28, but when the water pressure (spraying) stops for a line of mirrors 12, the bladder drains slowly through a fine orifice so that the gutter 28 stays engaged for a sufficient period of time for it to empty before it is rotated again) or through other control means. The intent of all of these types of designs is to minimize the manual opening and closing of the "gutter" "cap" and to avoid having to equip the solar field with additional actuation devices.

Figure 26:
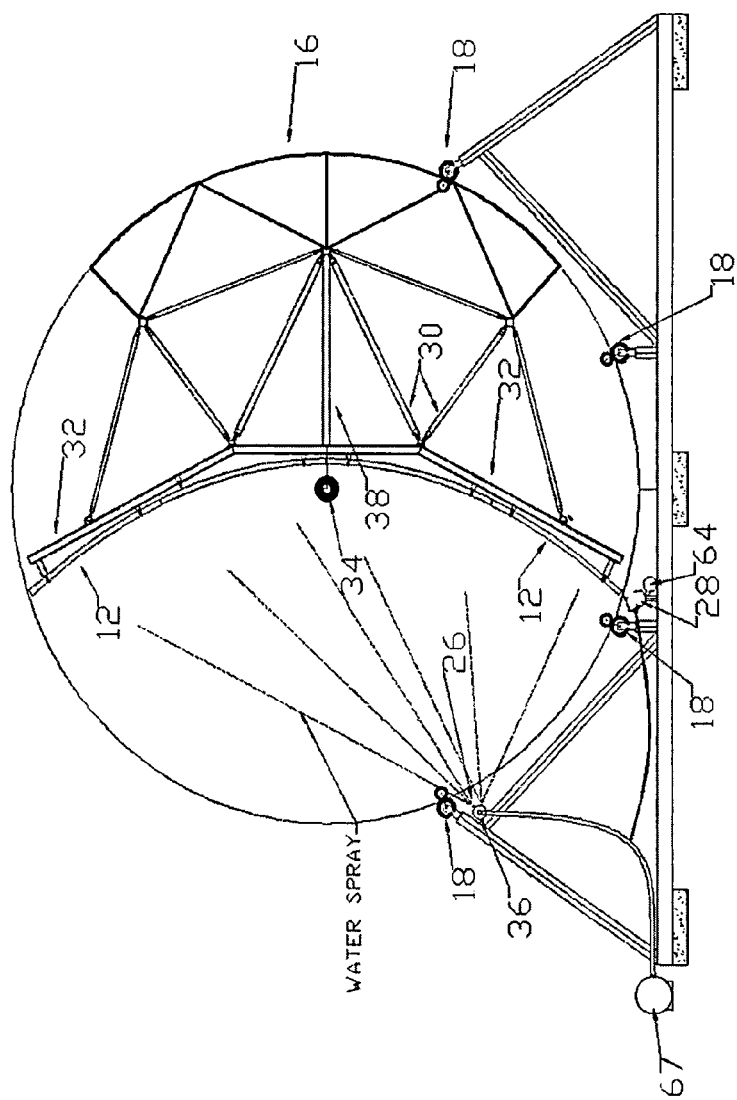
FIG. 26 is an end view of "Series 5" geometry solar frame, "Rolling Rib" including roller assemblies and water spray system/reclamation gutter.
Figure 27:
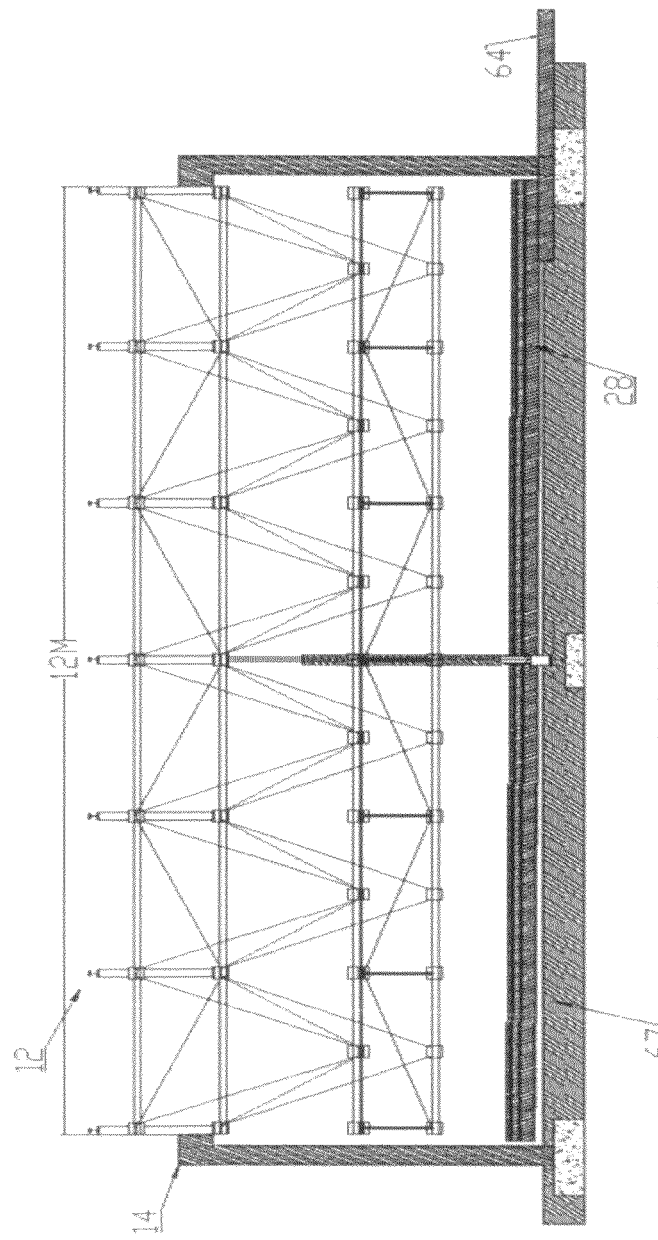
FIG. 27 is a side view of solar frame, "Rolling Rib" and water supply, gutter and drain lines.
Figure 28:
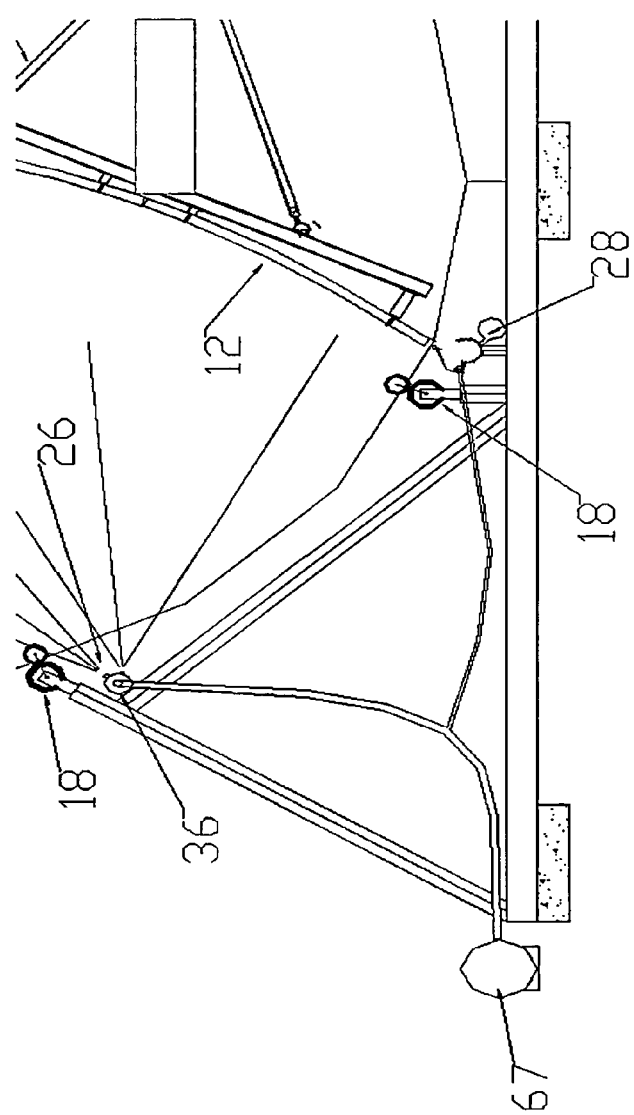
FIG. 28 is an overview of water supply, "Y" splitting the water between the spray nozzles and the gutter and other features.
Figure 29:
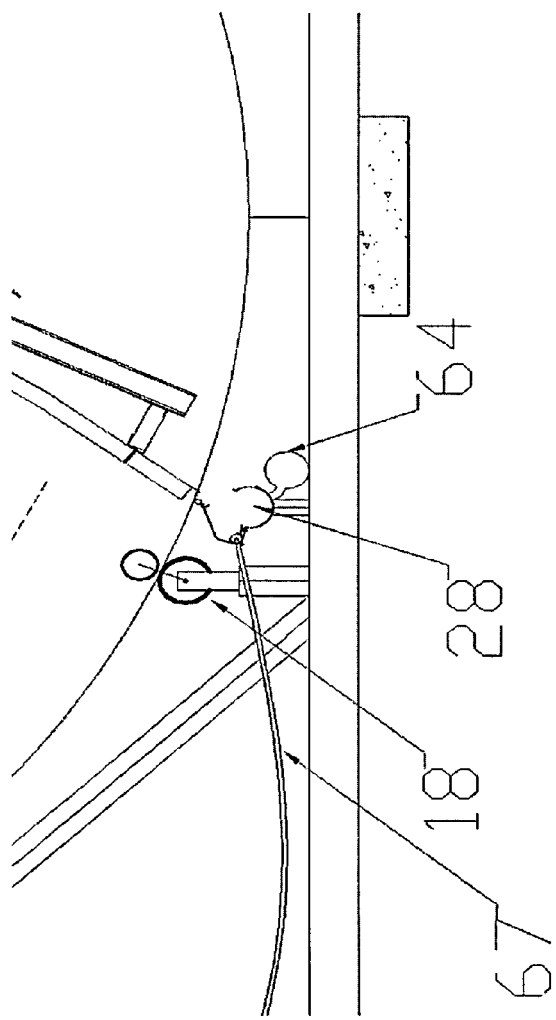
FIG. 29 is a close-up of roller assemblies guiding curved rib and gutter system including water supply to pressure tube which fills to rotate the device, thin drain line into gutter, main drain and simple snap fit gutter mounting upright.
Figure 30:
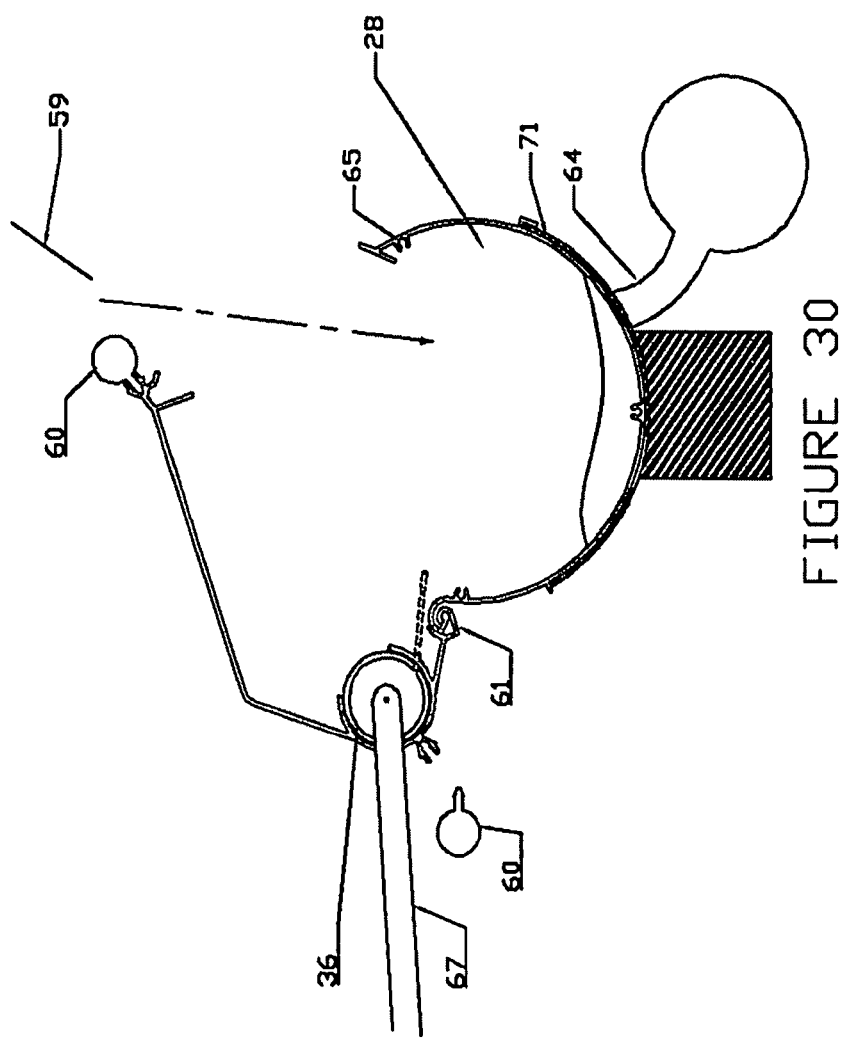
FIG. 30 is a close-up of a gutter showing how it snapfits into the mounting bracket.

FIG. 26 is an end view of solar frame 14, "Rolling Rib" including roller assemblies 18 and water spray/reclamation "gutter". This overview shows the Main Water supply 67 for cleaning, the piping of this water to the nozzles/sprayers and to the "gutter" "cap" 58 where the water fills the tube to tilt the "cap" 58 open. Also note the main drain 64. FIG. 27 is a side view of solar frame 14, "Rolling Rib" and water supply 67, gutter 28 (shown slanted slightly downward) and drain lines. FIG. 28 is an overview of water supply 67, "Y" splitting the water between the spray nozzles and the gutter 28 and other features. FIG. 29 is a close-up of roller assemblies 18 guiding curved "rib" 16 and "gutter" system including water supply 67 to pressure tube which fills to rotate the device, thin drain line into gutter 28, main drain and simple snap fit gutter 28 mounting upright. FIG. 30 is a close-up of "gutter" showing how it snapfits into the mounting bracket 71.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A support system for holding solar mirrors of a solar trough system, each of the mirrors having an axis, the system comprising:
   a parabolic trough frame for supporting the mirrors which rotates about an axis substantially parallel to the ground;
   a curved rib attached to the frame, curving around the axis substantially parallel to the ground, the curved rib having an axis, with the axis of the curved rib parallel to the axis of the parabolic trough frame and parallel with the axis of each of the mirrors; and
   at least a first roller having a curvature engaged with the rib along which the rib moves as the frame moves, the rib comprises a profile having a top portion that attaches to the frame, a central portion extending from the top portion and a bottom portion that engages with the first roller, the rib moving along the first roller as the frame rotates about the axis, the first roller comprises a housing which receives the rib, the first roller comprises a roller disposed in the housing on which the rib moves when the frame moves, and the housing is an aluminum extrusion, the rib has a cross section that is I shaped and is an I beam with flanges, the rib is curved about the axis parallel to the I Beam flanges, substantially parallel to the ground, the frame has a plurality of interconnected nodes, struts and chords supporting the mirrors from below the mirrors, the rib is an aluminum extrusion, the roller is a bottom roller and including at least a first top roller disposed above the bottom portion of the rib, and the bottom roller disposed below the bottom portion of the rib.

2. The system of claim 1 wherein the housing has a first segment in which the bottom roller having a curvature is disposed, a second segment in which the first top roller is disposed, the second segment having walls to which the first top roller is attached, and a third segment in which a second top roller is disposed, the third segment having a wall to which the second top roller is attached, the second top roller disposed over the rib.

3. The system of claim 2 wherein the surface of the rib approaching the bottom roller is guided into position by the curvature of the bottom roller and the beveled end of the rib.

4. The system of claim 3 wherein the rib includes a rack to engage a pinion.

5. A roller assembly engaging with a curved rib attached to a frame that holds mirrors of a solar parabolic trough system, the rib curving around an axis substantially parallel to the ground and comprises a profile with an I shaped cross section and is an I beam with flanges having a top portion that attaches to the frame, a central portion extending from the top portion and a bottom portion that engages with the roller assembly, the rib moving along the roller assembly as the frame moves, the roller assembly comprising:
   a housing which receives the bottom portion of the rib;
   a first roller disposed in the housing on which the rib moves when the frame moves; and
   a second roller disposed in the housing, the first roller disposed below the bottom portion of the rib and the second roller disposed above the bottom portion of the rib to constrain the rib from lifting out of the housing due to wind forces on the mirrors.

6. The roller assembly as described in claim 5 including at least a third roller disposed in the housing, the first roller disposed below the bottom portion of the rib and the second roller and the third roller disposed above the bottom portion of the rib to constrain the rib from lifting out of the housing due to wind forces or any lateral loads on the mirrors.

7. A support system for holding solar mirrors of a solar trough system comprising:
   a parabolic trough frame for supporting the mirrors which rotates about an axis substantially parallel to ground, the frame has a plurality of interconnected nodes, struts and chords supporting the mirrors from below the mirrors;
   a curved rib attached to the frame, curving around the axis substantially parallel to the ground, the curved rib having an axis, with the axis of the curved rib parallel to the axis of the parabolic trough frame, the rib is an aluminum extrusion; and
   at least a first roller having a curvature engaged with the rib along which the rib moves as the frame moves, the rib comprises a profile having a top portion that attaches to the frame, a central portion extending from the top portion and a bottom portion that engages with the first roller, the rib moving along the first roller as the frame rotates about the axis, the first roller comprises a housing which receives the rib, a roller disposed in the housing on which the rib moves when the frame moves, and the housing is an aluminum extrusion, the rib has a cross section that is I shaped and is an I beam with flanges, the rib is curved about the axis parallel to the I Beam flanges, substantially parallel to the ground, the roller is a bottom roller and including at least a first top roller disposed above the bottom portion of the rib, and the bottom roller disposed below the bottom portion of the rib.

* * * * *